United States Patent [19]

Fiasconaro

[11] Patent Number: 5,299,302

[45] Date of Patent: Mar. 29, 1994

[54] METHOD AND APPARATUS FOR TRIMMING B-SPLINE DESCRIPTIONS OF PATCHES IN A HIGH PERFORMANCE THREE DIMENSIONAL GRAPHICS SYSTEM

[75] Inventor: James G. Fiasconaro, Loveland, Colo.

[73] Assignee: Hewlett-Packard Company, Palo Alto, Calif.

[21] Appl. No.: 926,140

[22] Filed: Aug. 5, 1992

Related U.S. Application Data

[63] Continuation of Ser. No. 526,410, May 18, 1990, abandoned, which is a continuation of Ser. No. 11,667, Feb. 5, 1987, abandoned.

[51] Int. Cl.$^5$ ............................................. G06F 15/20
[52] U.S. Cl. ..................................... 395/142; 395/141
[58] Field of Search ............... 395/141, 142, 140, 125; 340/724, 726, 729, 744, 747, 750

[56] References Cited

U.S. PATENT DOCUMENTS 4,775,946 10/1988 Anjyo ................................. 364/522

OTHER PUBLICATIONS

Wu et al., "An Interactive Computer Graphics Approach to Surface Representation", Communications of the ACM-Oct. 1977 vol. 20 No. 10 pp. 703-712.
Hanna et al., "Intersection of Parametric Surfaces by Means of Look Up Tables", IEEE Oct. 1983, pp. 39-47.
Clark, "Designing Surfaces in 3-D", Communications of the ACM Aug. 1976, vol. 19, No. 8, pp. 454-460.
Rossignac et al., "Piecewise-circular Curves for Geometric Modeling", IBM J. Res. Develop. May 1987, pp. 296-313.

*Primary Examiner*—Phu K. Nguyen
*Attorney, Agent, or Firm*—Edward L. Miller

[57] ABSTRACT

A graphics accelerator responds to commands from a computer in a graphic system by storing the definitions of nonuniform rational B-spline patches and their associated trimming curves. The graphics accelerator then produces device coordinates for trimmed polygons computed for each patch and sends these polygons to a display. Various improvements are incorporated to minimize the effects of roundoff error. The B-spline definitions of the trimming curves in the uv parameter space of each patch are converted to approximating short straight line segments. Untrimmed polygon vertices, the end points of the straight line segments and the intersections of the straight line segments with subspan boundaries corresponding to polygon edges are kept in a data structure of linked lists of vertex tables. The data structure is traversed to determine new polygon vertices for trimmed polygons. The trimming mechanism is compatible with recursive subdivision of patches to overcome pratical limitations on the number of trimming curves that may be associated with each patch. The length of the straight line segments of the trimming curves is adjusted to compensate for less than ideal parameterization of the trimming curve functions. Associated with each trimming curve within a patch is information about the position of that trimming curve in the span. As each polygon for that patch is generated, those trimming curves that are clearly outside the clip limits for that polygon are excluded from consideration. This reduces the average number of trimming curves that must be processed for the patch, and increases the speed of the graphics accelerator.

4 Claims, 26 Drawing Sheets

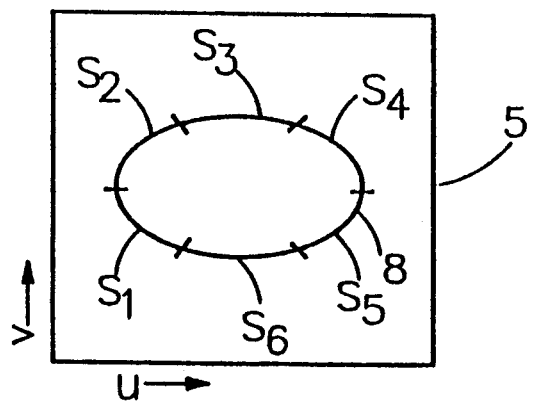
$$S_1 : \left\{ \begin{array}{l} u = f_{u1}(t) \\ v = f_{v1}(t) \end{array} \right\} \text{ FOR } t_0 \leq t \leq t_1$$
$$S_2 : \left\{ \begin{array}{l} u = f_{u2}(t) \\ v = f_{v2}(t) \end{array} \right\} \text{ FOR } t_1 \leq t \leq t_2$$
$$\vdots \qquad \vdots \qquad \vdots$$
$$S_6 : \left\{ \begin{array}{l} u = f_{u6}(t) \\ v = f_{v6}(t) \end{array} \right\} \text{ FOR } t_5 \leq t \leq t_6$$
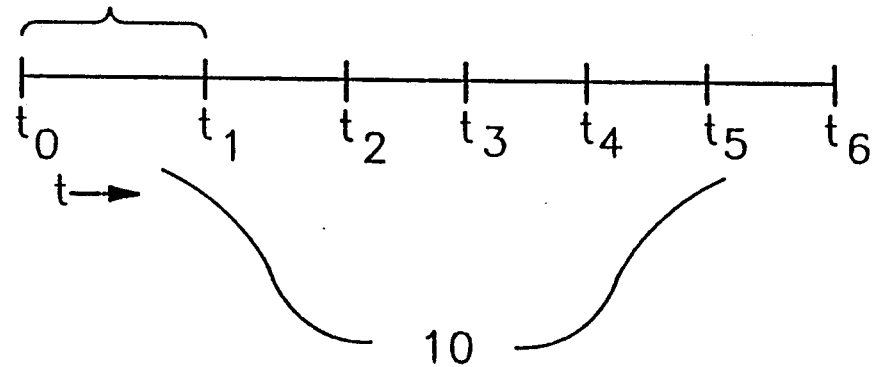
FIG 3

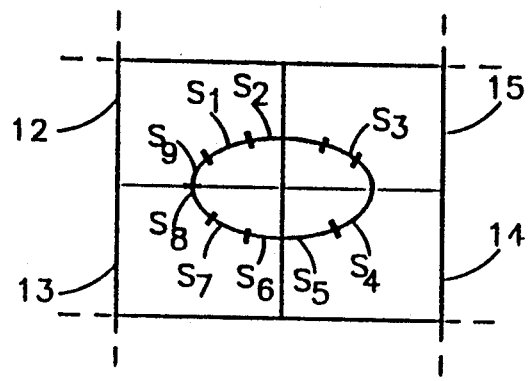
$$S_1 : \left\{ \begin{matrix} u = f_{u1}(t) \\ v = f_{v1}(t) \end{matrix} \right\} \text{ FOR } t_0 \leq t \leq t_1$$
$$S_2 : \left\{ \begin{matrix} u = f_{u2}(t) \\ v = f_{v2}(t) \end{matrix} \right\} \text{ FOR } t_1 \leq t \leq t_2$$
$$\vdots \qquad \vdots \qquad \vdots$$
$$S_9 : \left\{ \begin{matrix} u = f_{u9}(t) \\ v = f_{v9}(t) \end{matrix} \right\} \text{ FOR } t_8 \leq t \leq t_9$$
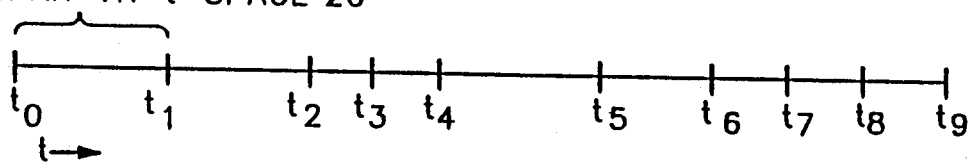
FIG 5

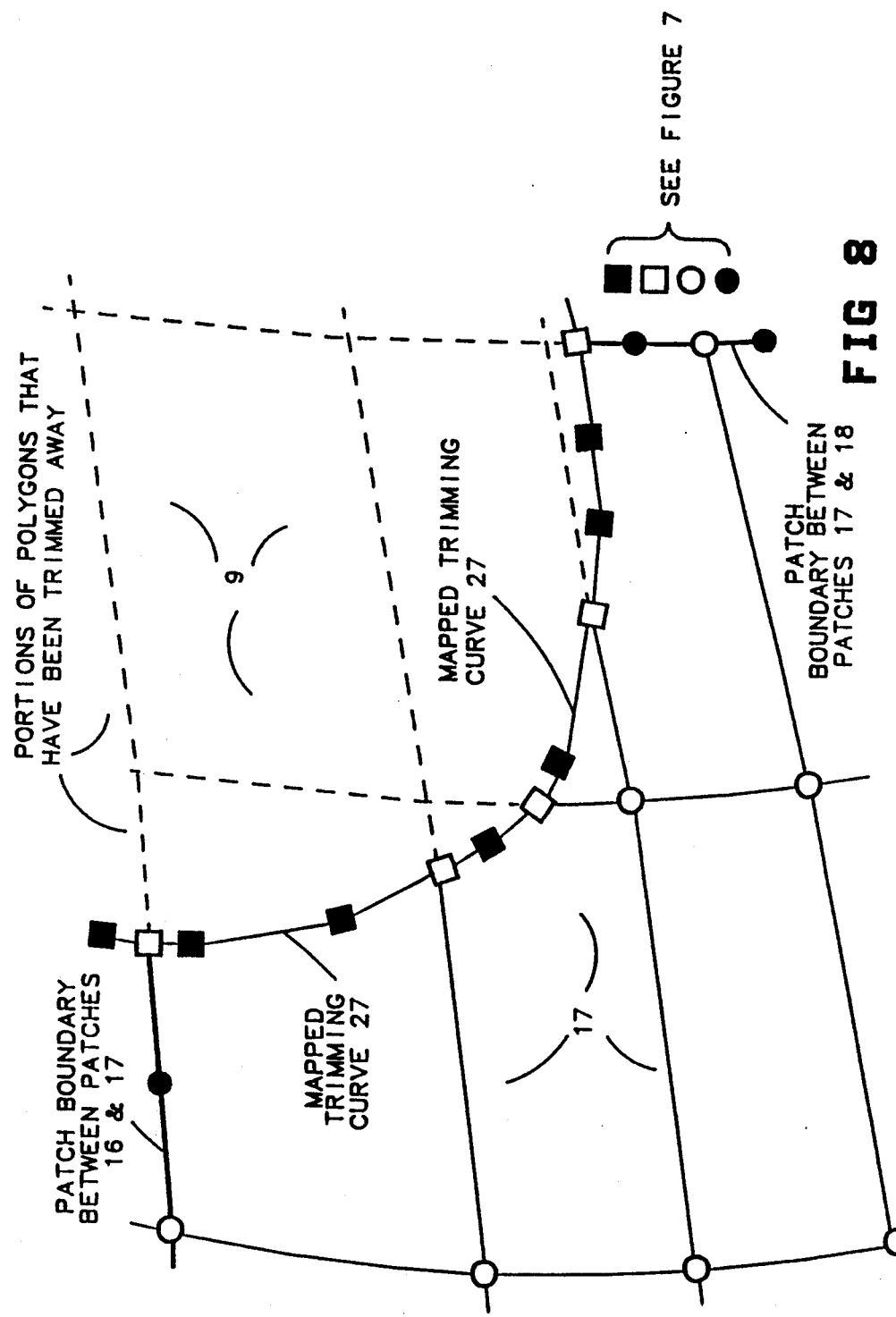

STEP #
1  FOR p=1 TO THE NUMBER OF SURFACES
2   FOR q=1 TO THE NUMBER OF PATCHES IN SURFACE$_p$
3    FOR i=1 TO THE NUMBER OF POLYGONS GENERATED IN PATCH$_q$
4     COMPUTE CLIP LIMITS $u_{left}$, $u_{right}$, $v_{top}$ AND $v_{bottom}$
      FOR POLYGON$_i$;

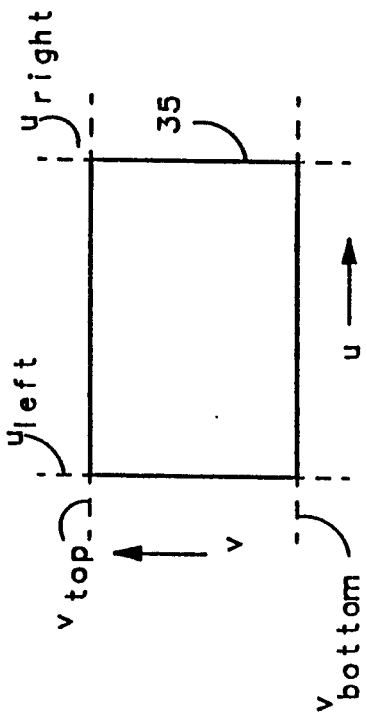

5    FOR j=1 TO THE NUMBER OF TRIMMING CURVES IN PATCH$_q$
6     FOR k=1 TO THE NUMBER OF STRAIGHT LINE SEGMENTS
      IN TRIMMING CURVE$_j$
7      CLIP STRAIGHT LINE SEGMENT$_k$ AGAINST CLIP
       LIMITS FOR POLYGON$_i$ AND FIND ANY
       □'s

FIG 9A

8         IF STAIGHT LINE SEGMENT$_k$ IS PARTIALLY OR COMPLETELY INSIDE CLIP LIMITS, THEN ADD ONE OR TWO VERTEX TABLES FOR SEGMENT$_k$ TO A LIST OF VERTEX TABLES FOR THE CURRENT CLIP LIMITS:

| 45 | 32-BIT u (CORRESPONDING TO A ■ OR ⊔ ) | | |
|---|---|---|---|
| 46 | 32-BIT v (CORRESPONDING TO A ■ OR ▫ ) | | |
| 47 | TRIMMING CURVE # | B-SPLINE SEGMENT # | SIX FLAG FIELDS |
| 48 | WRAP ADDRESS/0 | NEXT ADDRESS | |

9         NEXT k

10        NEXT j

11        PROCESS THE LIST OF VERTEX TABLES FOR POLYGON$_i$:

a       — FIND AND HANDLE CERTAIN SPECIAL CASES
    b       — INSPECT THE LIST AND FOR EACH POLYGON EDGE FORM A SUBLIST OF ▫'S c       — INTERLEAVE THE SUBLISTS WITH ORIGINAL UNTRIMMED POLYGON VERTICIES AND WITH EXTRA VERTICIES TO PRODUCE ONE CIRCULAR LIST FOR THE POLYGON d       — DETERMINE WHICH VERTICIES OF THE SUBLISTS ARE PRESENT ON THE SURFACE

FIG 9B

```
12      TRAVERSE THE INTERLEAVED LIST AND CREATE LISTS OF
        PRESENT TRIMMED POLYGON VERTICIES PRODUCED BY
        TRIMMING POLYGON; WITH THE j-MANY TRIMMING CURVES.
        THOSE PRESENT POLYGON VERTICIES MAY CORRESPOND TO:
    a       -- NO POLYGON
    b       -- SUBPOLYGONS OF THE ORIGINAL POLYGON
    c       -- THE ORIGINAL POLYGON

13      EXPORT THE LISTS OF PRESENT TRIMMED POLYGON
        VERTICIES TO THE POLYGON RENDERING MECHANISM FOR
        DISPLAY UPON THE CRT

14      NEXT i

15      NEXT q

16 NEXT p
```

FIG 9C

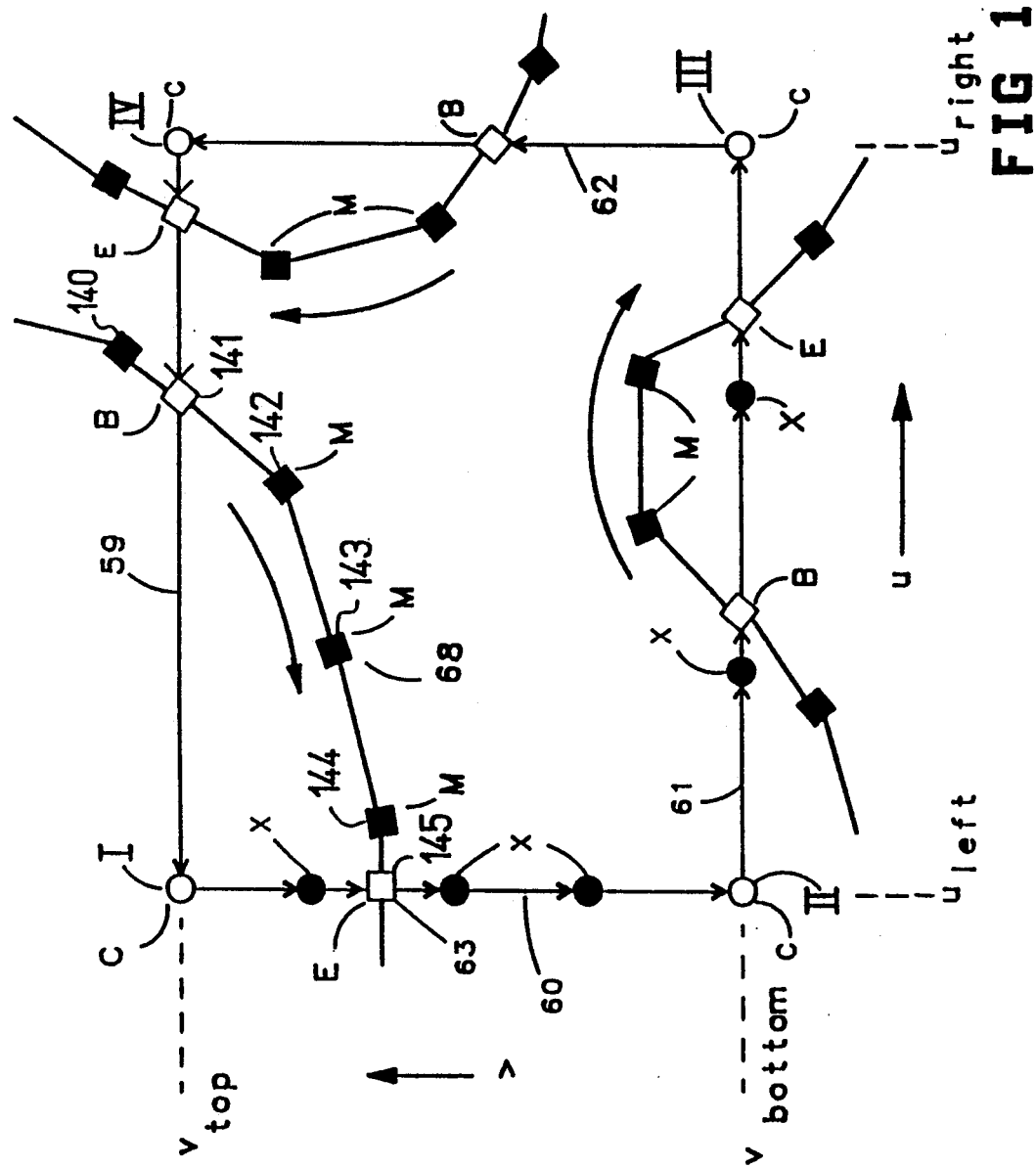

METHOD FOR DRAWING PORTIONS
OF POLYGONS THAT ARE PRESENT ON THE SURFACE

```
(*  THE VARIABLES CHECK AND TRACE ARE POINTERS TO THE
    LINKED LIST OF VERTEX TABLES OF FIG. 9  *)
(*  THE NOTATION CHECK.XXX REFERS TO THE XXX FIELD OF THE
    VERTEX TABLE POINTED TO BY CHECK  *)

CHECK := ADDRESS OF TABLE FOR VERTEX I
            CHECK.START := 1

CHECKLOOP:  IF CHECK.MARK = 1 OR CHECK.IN = 0
               THEN GOTO MOVE.CHECK
            TRACE := CHECK

TRACELOOP:  TRACE.MARK := 1
            IF TRACE.TRIMMING_CURVE_# <> 0
               THEN GOTO COPYDATA
            COMPUTE XYZRGB COORDINATES FOR A POLYGON VERTEX
            IF TRACE.FF1 <> BEGIN THEN GOTO MOVETRACE

MIDDLELOOP: IF TRACE.WRAP_ADDRESS = 0
               THEN TRACE := TRACE + LENGTH_OF_TABLE
               ELSE TRACE := WRAP_ADDRESS
            IF TRACE.MARK = 1 THEN GOTO DRAWPOLY
            TRACE.MARK := 1
            COMPUTE XYZRGB COORDINATES FOR A POLYGON VERTEX
            IF TRACE.FF1 = END THEN GOTO MOVETRACE
            GOTO MIDDLELOOP

COPYDATA:   COPY XYZRGB FOR A CORNER OR EXTRA VERTEX

MOVETRACE:  TRACE := TRACE.NEXT_ADDRESS
            IF TRACE.MARK = 0 THE GOTO TRACELOOP

DRAWPOLY:   DISPLAY THE POLYGON

MOVECHECK:  CHECK := CHECK.NEXT_ADDRESS
            IF CHECK.START = 0 THEN GOTO CHECKLOOP (*  TRIMMING NOW COMPLETE FOR THIS POLYGON  *)
```

FIG 17

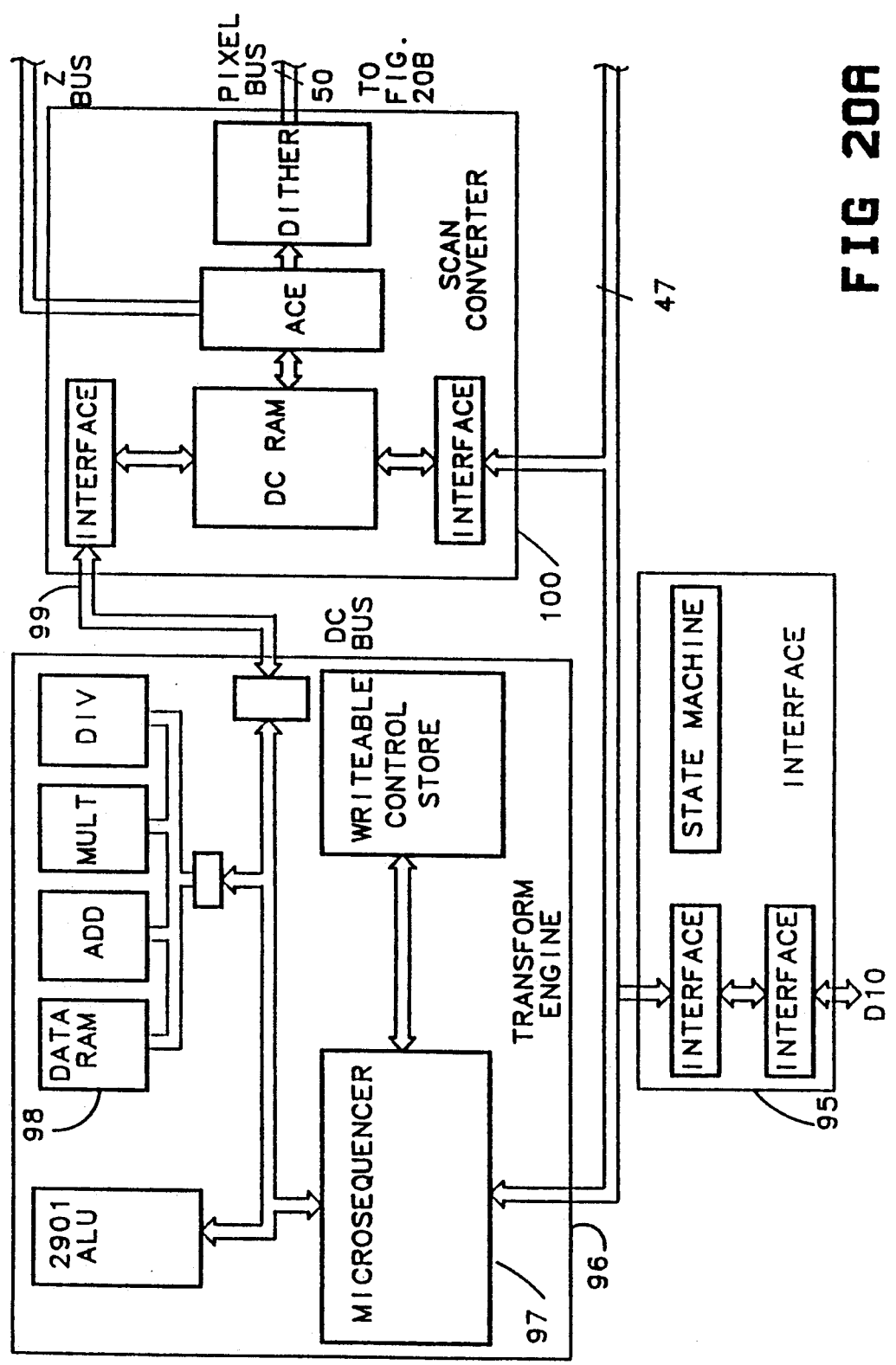

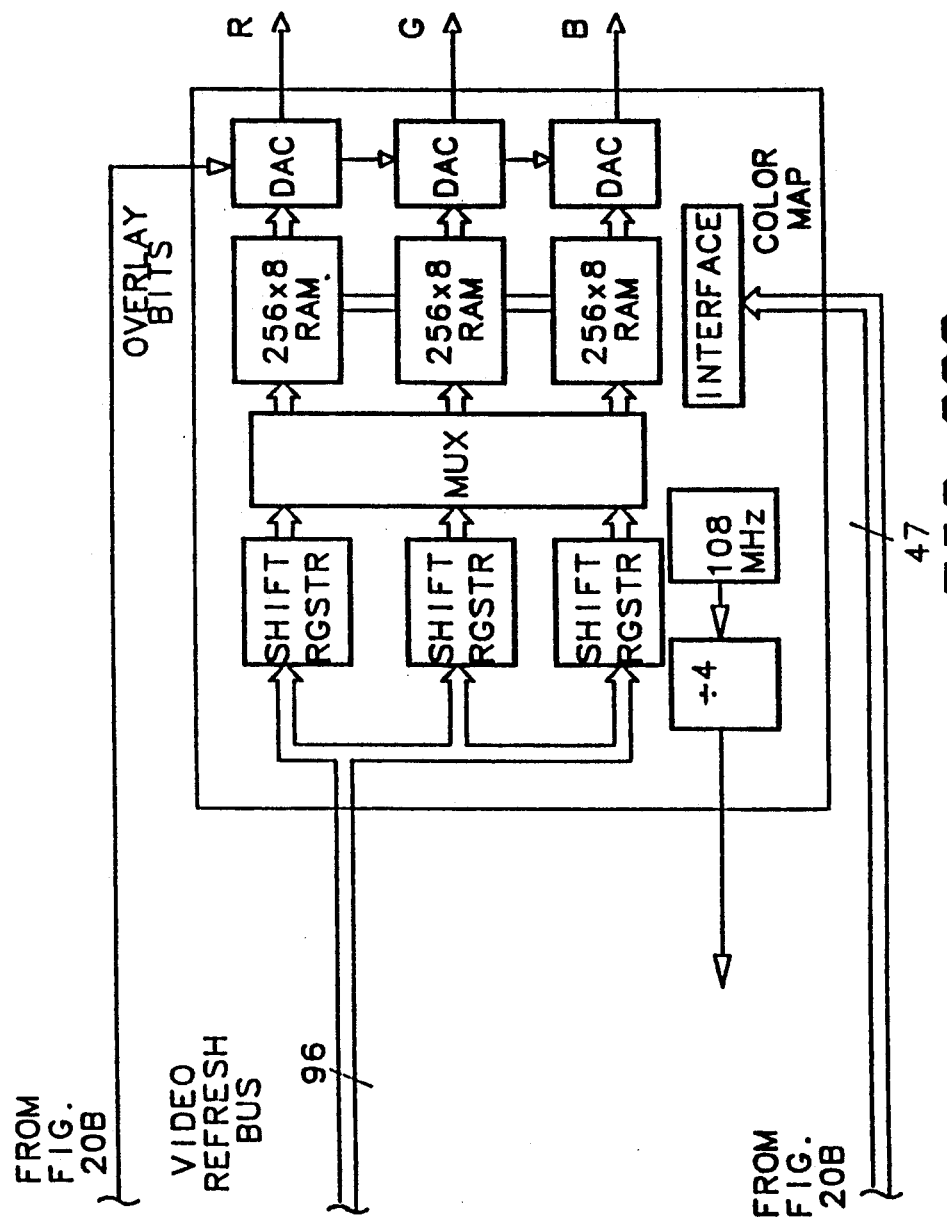

METHOD AND APPARATUS FOR TRIMMING B-SPLINE DESCRIPTIONS OF PATCHES IN A HIGH PERFORMANCE THREE DIMENSIONAL GRAPHICS SYSTEM

REFERENCE TO RELATED APPLICATION

This is a continuing application from application Ser. No. 07/526,410 entitled METHOD AND APPARATUS FOR TRIMMING B-SPLINE DESCRIPTIONS OF PATCHES IN A HIGH PERFORMANCE THREE DIMENSIONAL GRAPHICS SYSTEM filed May 18, 1990 by James G. Fiasconaro and assigned to Hewlett-Packard Co. but now abandoned, which in turn was a continuing application of Ser. No. 07/011,667 of the same title and filed Feb. 5, 1987 by the same inventor and having the same assignee, also now abandoned.

BACKGROUND AND SUMMARY OF THE INVENTION

A typical high performance three dimensional graphics system will describe a surface to be rendered as surface patches defined by functions for each patch. Such functions might be, for example, nonuniform rational B-splines. The use of B-splines imposes certain limitations upon the edges of surface patches. Associated with B-spline functions is a normally rectangular uv parameter space. Parametric patch generation functions of u and v compute the values of the coordinates in XYZ space. The rectangular uv space limits the exactness with which the B-spline patch generation functions can represent surface patches having edges of certain shapes. For example, it is difficult to produce a good B-spline description for a patch that is a rectangular region with a circular portion removed from its interior. Either of the rectangular region or the circular portion by themselves would be practical, but their combination is too complex a primitive for a single unified B-spline description at the patch level. Subdividing the patch thwarts the motive for having patches in the first place. Trimming is a way to augment the B-spline description of the rectangular region with another one for the circular portion, and producing a hybrid surface patch in which one B-spline description "trims away" the surface described by another.

In the prior art, trimming has been performed by the software of the graphics system prior to the sending of device coordinates to the display hardware. Such trimming is necessarily a very complex task, and is generally too slow for use with moving images or interactive systems. It would be desirable to retain the use of B-splines and achieve the advantages offered by that technique of surface description, but at the same time allow high speed trimming.

According to a preferred method of the invention, trimming is performed on B-spline surface patch descriptions in a hardware graphics accelerator. It receives B-spline descriptions of the patch generation functions for the untrimmed patches and B-spline descriptions of trimming curves in the uv parameter space of the patch generation functions. The B-spline descriptions of the trimming curves are themselves functions of a parameter t. The graphics accelerator computes a sufficiently dense point by point representation of each trimming curve in uv space, in addition to point by point representations of the individual subspans in uv space whose associated polygons in XYZ space approximate the patch. The graphics accelerator determines where straight line approximating segments of the trimming curves cross subspan boundaries and changes the vertices of the subspans to trim away portions of the associated polygon. It does this by building a data structure of linked lists of vertex tables that represent the untrimmed polygon and any trimming curves that cut it. An appropriate traversal of the lists in the data structure produces a list of trimmed polygon vertices in device coordinates. That list may then be further processed to the pixel level by other hardware in the graphics accelerator.

Considerable attention is paid to avoiding the evils of roundoff error. A mechanism for describing where in a span a trimming curve is located allows the trimming operation to exclude from consideration those trimming curves that cannot possibly affect the polygon being processed. Another mechanism compensates for the effects of a non-ideal parameterization of the trimming curve functions, to prevent the production of an unnecessarily high number of polygon vertices. The trimming method is also compatible with recursive subdivision of patches to handle patches with a high number of trimming curves.

BRIEF DESCRIPTION OF THE DRAWINGS

FIG. 3 illustrates a parametric trimming curve function segmented over several spans of the one dimensional t space and defining a trimming curve in the two dimensional uv space.

FIG. 5 illustrates the segmented trimming curve of FIG. 4 in greater detail.

FIG. 8 is an expansion of a portion of FIG. 7 showing how the shapes of polygons are changed by being crossed by a mapped trimming curve.

FIGS. 9A–C comprise a simplified section of pseudo-code describing the processing steps used to produce polygons crossed by mapped trimming curves and whose shapes have been adjusted accordingly, and include an illustration of the structure of a polygon vertex table whose instances are linked together into lists describing polygons.

FIG. 14 illustrates a useful example of a subsapn in uv space crossed by certain particular trimming curves, and serves as the basis of an explanation of how the linked boundary list of vertex tables and its linked trimming curve sublists are traversed to produce polygons that are present ON the surface.

FIG. 17 is a simplified section of pseudocode pertaining to the same subject matter as FIGS. 16A-C, but with more detail concerning the structure of the vertex tables shown in FIG. 9B and FIG. 15.

FIGS. 20A-C comprise a simplified hardware block diagram of the graphics accelerator of FIG. 19.

DESCRIPTION OF A PREFERRED METHOD

Figure 1:
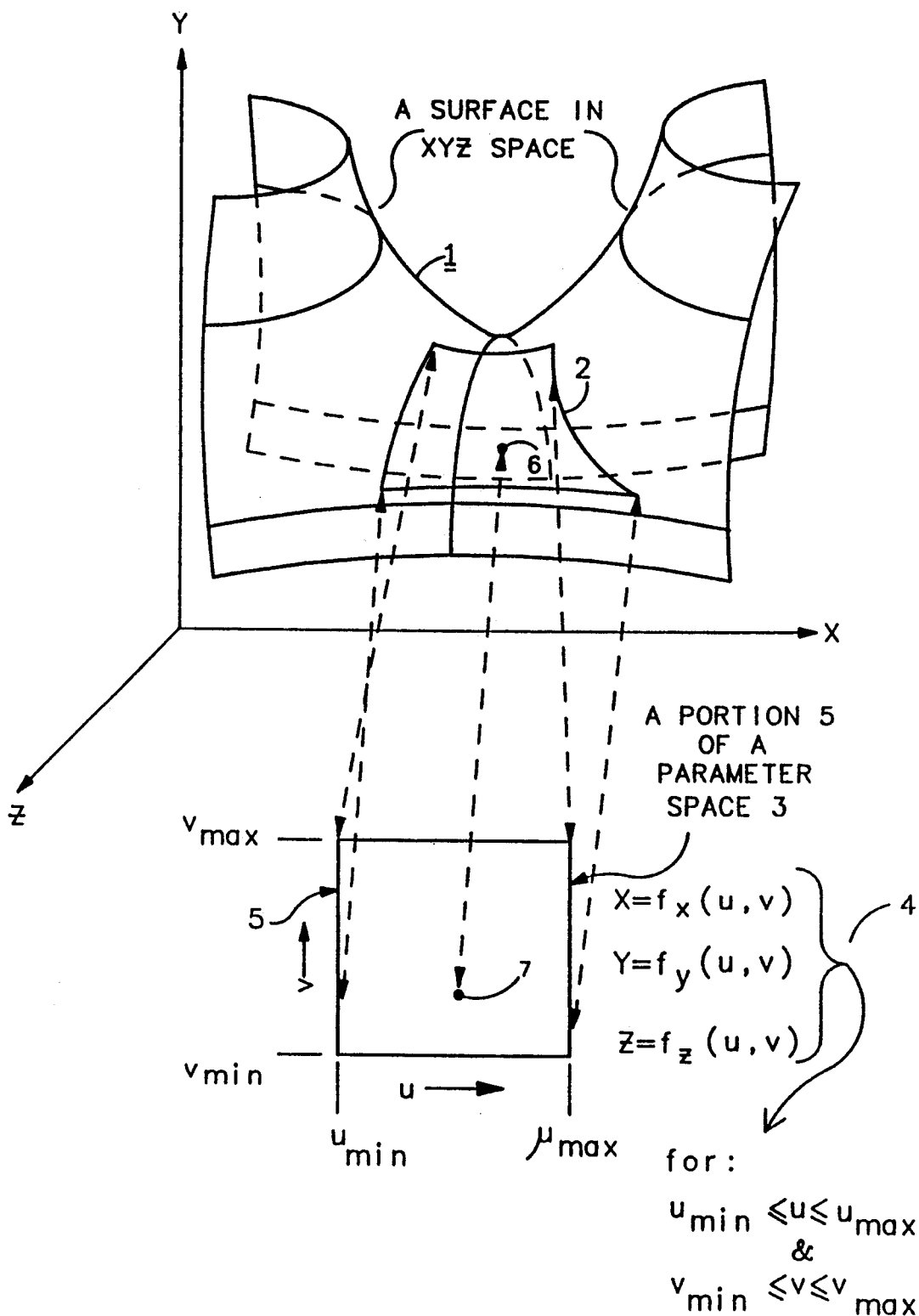
FIG. 1 is an illustration of a surface in XYZ space approximated by patches formed by mapping spans of a two dimensional uv parameter space into XYZ space with parametric patch generation functions, such as nonuniform rational B-splines.

We shall begin by considering one way that a three dimensional surface may be represented within a graphics system. Suppose, for example, that a saddle-shaped surface 1 such as the one depicted in FIG. 1 were to be represented. This would be accomplished by dividing the entire surface 1 into smaller portions (commonly called patches), of which the patch 2 is illustrative. To adequately render a surface as complicated as the saddle shape 1 a great many patches would be required. For the sake of simplicity we begin by showing only one patch 2; it will be understood that the graphics system would include some means to divide the surface into appropriate patches. Also, the various other curved lines in FIG. 1 are not there to suggest other patches (although they might), but are instead offered as an aid in appreciating the shape of the surface 1. Furthermore, it will be understood that, although the surface 1 resembles a hyperbolic paraboloid, the method to be described is particularly applicable to irregular ("free-form") surfaces, especially those rendered from parametric B-spline descriptions.

Associated with a patch is a portion 5 of a parameter space 3. The portion is called a span. To describe a three dimensional surface in XYZ space a two dimensional paramenter space is employed. In the present example the two paramenters are u and v, and each is allowed to vary between associated maximum and minimum values. As shown in the figure, a set of parametric patch generation equations 4 map values in the parameter space 3 into XYZ space to produce the (X,Y,Z) triples that lie on the patch 2.

A modern high performance graphics system will store a complete description of the object, independent of any particular view that may be desired. Often this description takes the form of a data base, particularly when subportions of the object are described separately and then deployed by reference, perhaps a multiplicity of times. Rather than store in the database an exhaustive collection of points on the surface it is common to instead employ a more compact type of description, such as approximating functions that yield values to a desired degree of resolution. When a particular view is wanted it is found by computing translations and or rotations for points first found by evaluation of the approximating functions in the database. B-splines are a technique for achieving such a compact representation through parametric functions.

Even an introductory explanation of B-splines is beyond what can be included here, and the reader is referred to the various reference works on the subject (e.g.: Fundamentals of Interactive Computer Graphics by J. D. Foley and A. Van Dam, Addison-Wesley, 1984; and an article entitled Rational B-Splines for Curve and Surface Representation, IEEE Computer Graphics and Applications, vol. 3 no. 6, Sept. 1983). Fortunately, it is not necessary here to understand in depth what B-splines are and how they work. Various software packages exist to produce B-spline descriptions of desired solid objects and surfaces. The point to be made here is that, while the method of the invention lends itself well to use with B-spline descriptions of solid objects and surfaces, the use of B-splines is in no way required. However, since the preferred method has been used in a graphics system that does employ B-splines, it is most convenient to describe the method in that setting. That graphics system is the Hewlett-Packard 9000 Model 320SRX, which includes, in particular, a HP Model 98720A Graphics Accelerator.

Specifically, FIG. 1 illustrates that each point 6 on a surface of interest 1 can be represented by a corresponding point 7 in some portion 5 of a parameter space 3. The user of the graphics system interacts with that system in defined ways set out in an operating manual for the system. By using appropriate commands a desired surface may be constructed. In general, the surface will be composed of a multiplicity of patches. For each patch upon a surface in XYZ space, the internal activities of the graphics system produce three (or perhaps four) patch generation functions of u and v. The variables u and v belong to the parameter space 3. The x coordinate of the point 6 is found by evaluating a (polynomial) function $F_x(u,v)$. Corresponding functions $F_y$ and $F_z$ produce the y and z coordinates of the point 6. A more general case (rational B-splines) for three coordinates uses four functions:

$$x = F_x(u,v)/H(u,v)$$

$$y = F_y(u,v)/H(u,v)$$

$$z = F_z(u,v)/H(u,v)$$

In this case each of the functions $F_x$, $F_y$ and $F_z$ has been rationalized through division by the function H. The method to be described is compatible with either rational or nonrational nonuniform B-spline representations.

Figure 6:
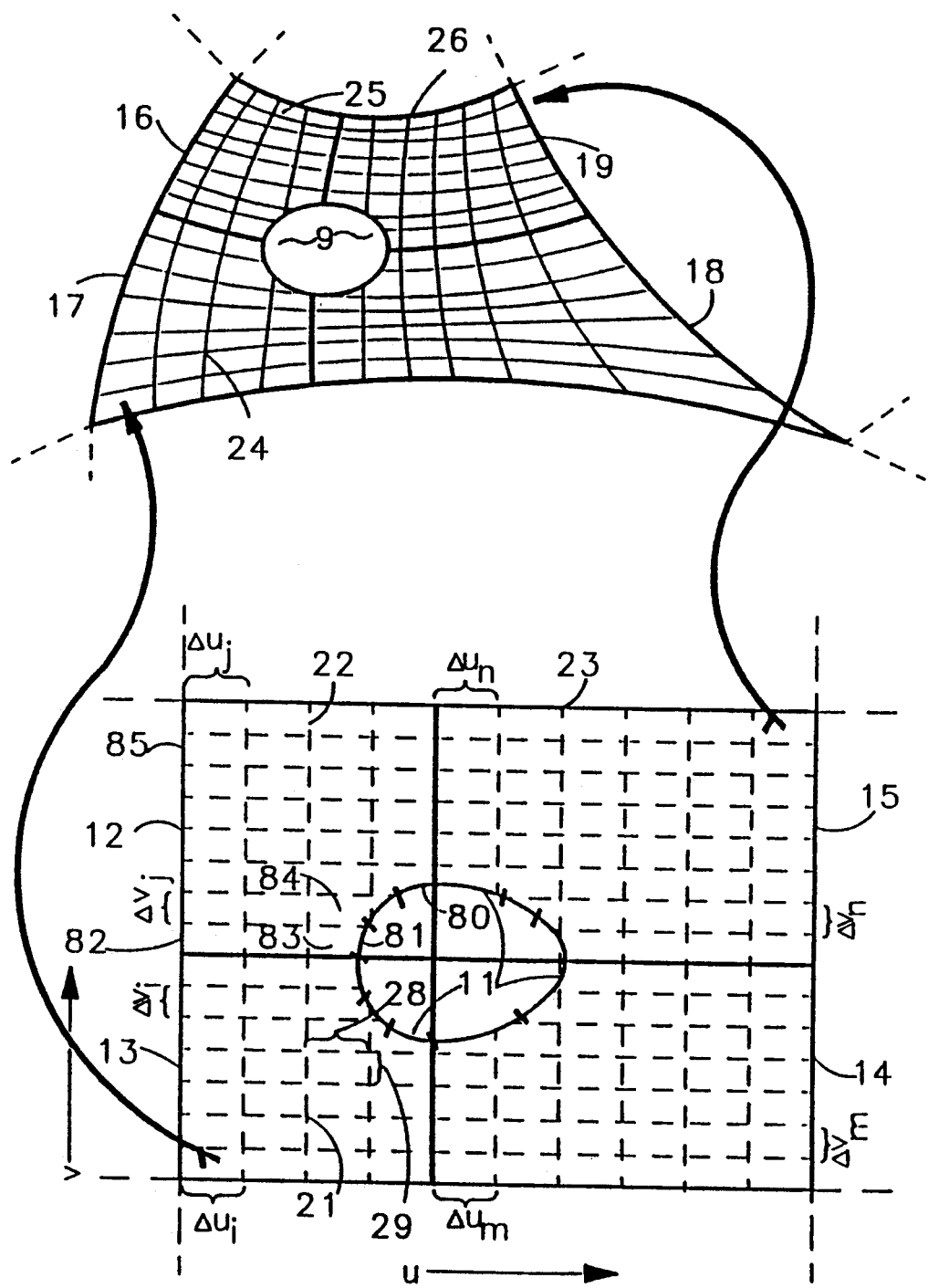
FIG. 6 shows how the spans in uv space are divided into subspans to produce surface approximating polygons for the surface in XYZ space, and also indicates that the trimming curve in uv space crosses the subspans while the mapped trimming curve trims the polygons on the surface.
Figure 7:
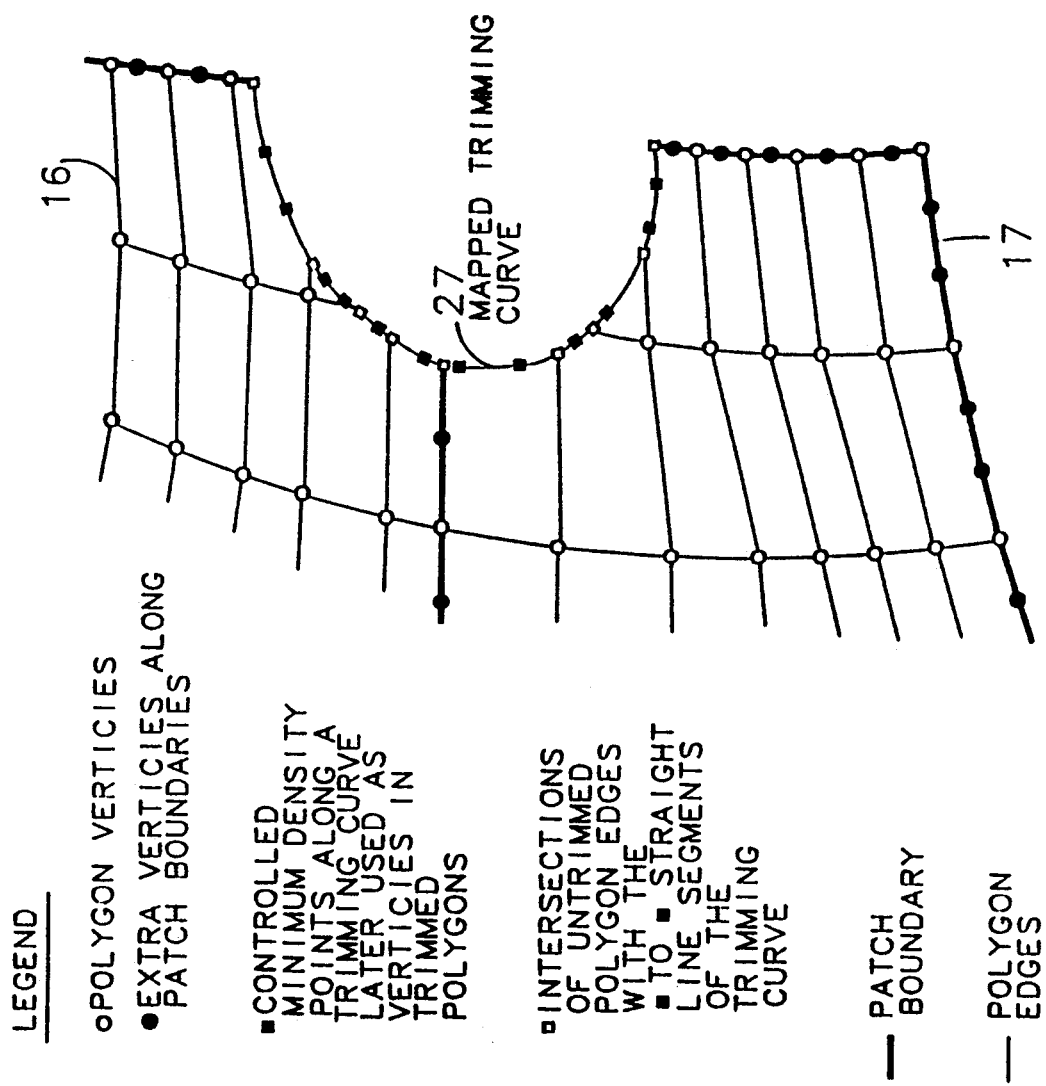
FIG. 7 is an enlarged view of a portion of FIG. 6, illustrating the presence of extra vertices along patch boundaries and along mapped trimming curves for better patch-to-patch transitions, and the presence of points along the mapped trimming curve defining points of intersection with the polygon edges as well as approximating points within the interior regions of polygons crossed by the mapped trimming curve.

Conceptually, one could compute all the pixel values for the surface by evaluating the B-spline patch generation functions for a sufficiently dense cartesian product of the variables u and v; i.e., by evaluating a sufficiently dense collection of points in the parameter space 3. In practice, however, such an approach requires an inordinate amount of execution time, and is generally avoided in favor of one that requires only quicker and more easily performed computations. The polylgon method to be described in connection with FIGS. 6-8 is such a favored approach. According to this approach the set of points evaluated in the parameter space for a given patch are selected to be just dense enough to yield polygons vertices for polygons that, when interpolated by shading, produce an acceptably smooth surface. Since each polygon contains a multitude of pixels whose values are relatively easily found by linear interpolation done in hardware, a considerable reduction in image preparation time is achieved.

It is unlikely that one set of functions 4 entirely describes a complete surface of interest. Instead, collections of B-spline patch generation functions are found that provide a good approximations of the desired surface over small regions. This piecewise approximation divides the parameter space into regions, called spans. The piecewise approximation is what actually divides the surface into the corresponding patches. To render a patch, its corresponding B-spline functions are evaluated over the range of the associated span. Acccording to the desired resolution for the displayed object (i.e., the polygon size), suitable step sizes are selected for increments to u and v. The parameter u is allowed to range in equal steps from $u_{min}$ to $u_{max}$, while the parameter v ranges in equal steps (not necessarily the same as those for u) from $v_{min}$ to $v_{max}$. This evaluation of the span produces "raw" polygon vertices that are generally subjected to a fair amount of further processing prior to being displayed.

Thus we see that the surface to be displayed is described as a collection of patches, each of which has an associated span. Associated with each span is a particular collection of B-spline patch generation functions.

Recall that it was said above that by using appropriate commands the user can construct a desired surface. Suppose, for example, that a flat plate having a hole in it were the desired object. With a typical solid modeling package a user would select from a menu a suitable primitive shape, such as a rectangular solid, and specify its dimensions. He would then specify the location of the center of the hole, and "subtract" from the plate a cylinder of the desired diameter. It is a practical matter to produce a B-spline description of a rectangular plate It is also a practical matter to obtain a B-spline description of the cylinder to be removed by "drilling" the hole. However, it is not a practical matter to consider the plate with the hole already in it as a primitive shape having its own particular B-spline description.

The method of the invention affords a solution to the problem of complex surfaces that do not have practical B-spline descriptions. Just as the hole in the plate has an edge in XYZ space, there are corresponding points in uv space which, when evaluated, will exactly describe or closely approximate the edge of the material to be removed to produce the hole. These points lie along a curve in uv space, called a trimming curve. The trimming curve can be represented by one or more functions. These functions can be found by the solid modeling package. Thereafter, the rendering of a patch having a "subtracted" portion can be accomplished by a qualified evaluation of the patch generation functions for the associated span. The qualification takes the form of determining, during the evaluation of the patch generation functions, whether the (u,v) pair at hand lies on, inside or outside of the timming curve. The qualification produces a decision about whether or not to display the associated (X,Y,Z) triple. If that triple is to be displayed, things proceed as previously described. However, if the evaluation of that (u,v) pair would produce a polygon vertex lying within the region to be subtracted, then the triple cannot be displayed and the existing polygon structure must be modified.

Figure 2:
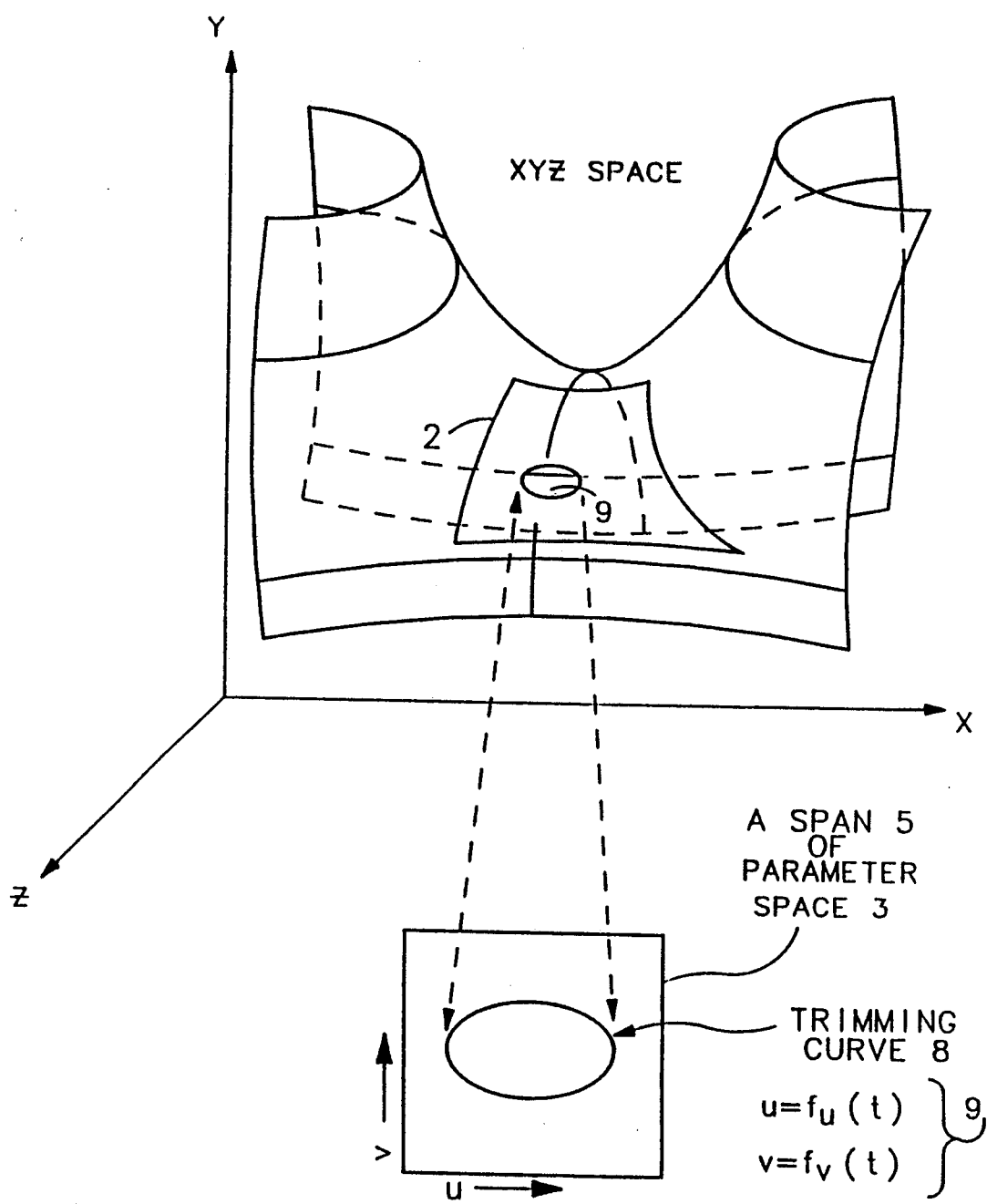
FIG. 2 shows how a parametric function of a one dimensional t space can define a trimming curve in uv space that in turn can be mapped into XYZ space to identify a region that is absent from the surface.

FIG. 2 illustrates the use of a trimming curve 8 to describe the boundary in XYZ space of a region 9 to be subtracted from patch 2. The trimming curve 8 is defined in a span 5 of the parameter space 3. In the preferred method the trimming curve 8 can itself be defined by B-splines. A pair of parametric equations 9 of a parameter t can define a two dimensional trimming curve in uv space. After the fashion of the patch generation functions, trimming curve functions 9 can be either rational or nonrational non uniform B-splines.

Just as a surface is composed of patches and their associated collections of different patch generation functions, a trimming curve must generally be piecewise assembled from subportions called segments. Each segment has its own particular trimming curve functions 9.

This state of affairs is depicted in FIG. 3 for the trimming curve 8 of FIG. 2. That trimming curve has been broken into a number of segments $S_1$ through $S_6$. Note that each segment has its own functions that are defined over corresponding spans of t space 10.

Figure 4:
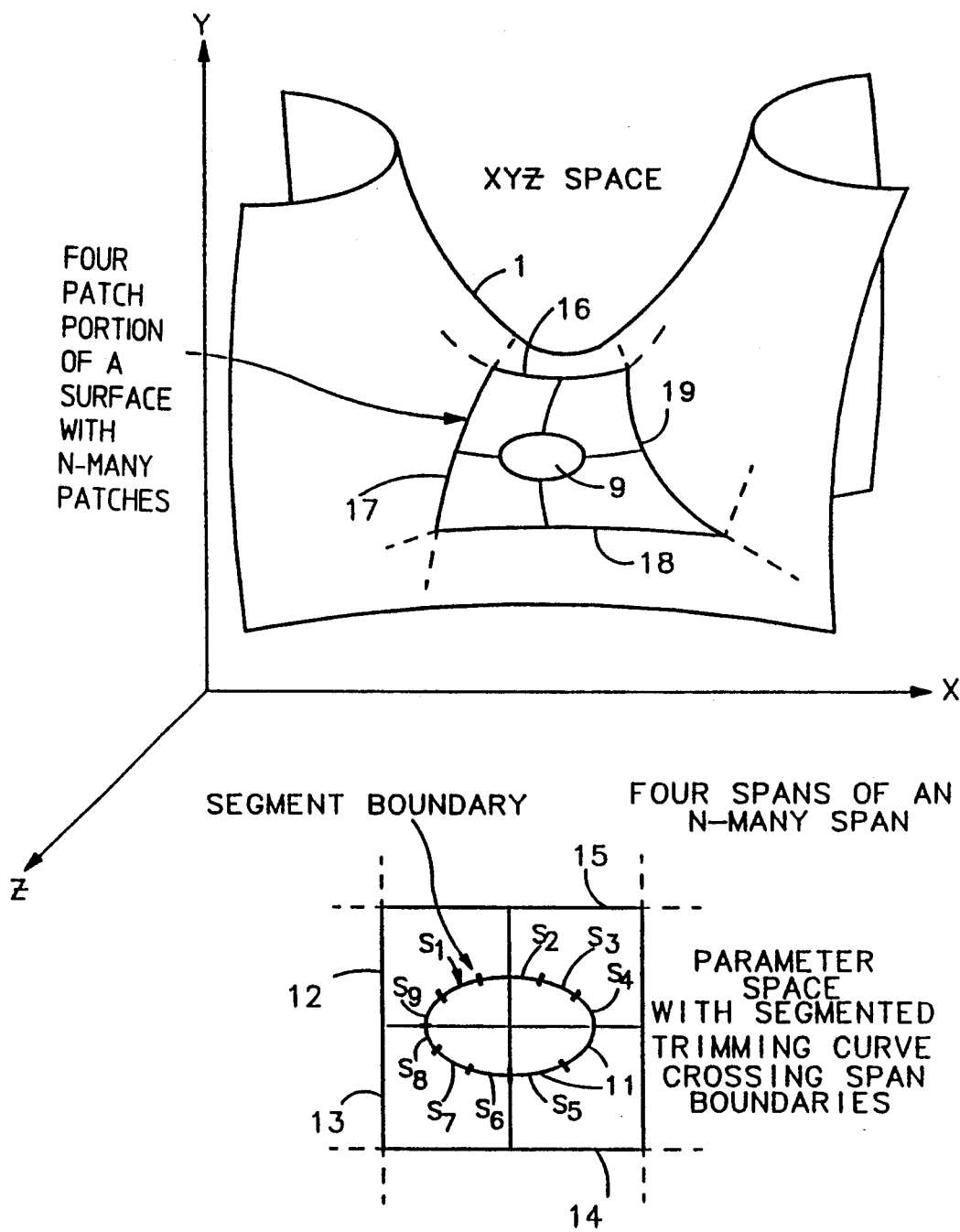
FIG. 4 illustrates how a segmented trimming curve function can cross several spans of uv space to define a mapped trimming curve in a corresponding number of patches in XYZ space.

FIG. 4 describes a generalization of the application of trimming curves. What is shown is similar to the situation depicted in FIGS. 2 and 3, but with the difference that the trimming curve 11 now traverses several spans 12-15 in uv space. This situation arises because, as luck would have it, the portion 9 to be subtracted from the surface 1 occupies the four corresponding patches 16-19. The segment boundaries of the trimming curve 11 are shown on that curve in FIG. 4. Note that, in general, the boundaries between the segments $S_1$ through $S_9$ may fall anywhere along the trimming curve 11. In particular, they need not have any special relationship to the boundaries between the spans 12-15.

FIG. 5 depicts the piecewise representation of the segmented trimming curve 11 of FIG. 4. Note the use of different parametric equations for each segment, and that each set of those equations is defined over it own associated span in t space 20.

During the discussion of FIG. 1 and the patch generation functions the notion of polygons was briefly introduced. Beginning now with FIG. 6 we return to this topic, and examine in more detail the effects of trimming upon the technique of rendering a surface with polygons.

FIG. 6 shows four spans 12-15 that map, according to the heavy arrows, into the four patches 16-19. Each of the spans is traversed by a trimming curve 11, whose purpose is to define the trimmed (or "subtracted") region 9 in the resulting surface. At present our interest in FIG. 6 is in the generation of (untrimmed) polygons; the effects of trimming curve 11 upon those polygons will be considered beginning with the Figures and text that follow FIG. 6.

The process of generating the patches is carried out one patch at a time. Accordingly, spans are evaluated one at a time; each span produces one associated patch. The evaluation of a span involves the determination of step sizes for u and v. These step sizes are not necessarily the same for u and v, and each is again determined upon beginning the evaluation of the next span. That is, the step sizes delta $u_i$ and delta $v_i$ for span 13 need not be equal to each other, nor need they bear any relationship to the step sizes delta $u_j$ and delta $v_j$ for span 12. In particular, there is no requirement that delta $u_i$ equal delta $u_m$ or equal delta $u_n$, even though for simplicity they appear to be equal in the figure. A similar statement applies to the delta v's.

The user of the graphics system will have at least indirect control over the step sizes. In some systems it may be possible for the user to specify them directly, although it is more likely that the specification is arrived at indirectly. For example, the user may instruct the graphics system to choose step sizes such that the resulting polygon edges have approximately a particular number of pixels. Bear in mind that, in general, the step sizes can be redetermined afresh for each span.

The selection of step sizes for a span determines a collection of (u,v) pairs within that span. This is represented by the dotted lines withing the spans 12–15. The intersections of the dotted lines with themselves, and of the dotted lines with the solid lines representing the boundaries of the spans, are the points at which the patch generation functions are evaluated. For example, the evaluations of the patch generation functions at points 21–23 produces polygon vertices 24–26; (these points are simply arbitrary vertices in different polygons).

There are two further things to note before leaving FIG. 6. First, the adjoining edges of the polygons in the patches 16–19 are straight line segments. An attempt has been made in the figure to show this. In contrast, the patch boundaries and the edge of the trimmed region 9 appear much smoother. They too are rendered with straight line segments, but with ones that are significantly shorter. That is, there are more points in uv space evaluated to produce those lines in the patches. Essentially, there is a mechansim for slipping extra points into the span evaluation process. This notion of differential density will be further discussed among the topics that follow. Second, the process described above of evaluating patch generation functions at points in uv space evaluates points in in all portions of the span, including those that will eventually be trimmed away. Trimming is a fairly complicated process, requiring the analysis of several possible situations For example, a given vertex may belong to a polygon that is totally unaffected by trimming, one that is to be trimmed away in its entirety, or, to one that is crossed by the trimming curve (as it is mapped into XYZ space). In this latter case part of the polygon remains and part of it does not. This requires changing the shape of the polygon to match the ("mapped") trimming curve. That, in turn, will require the finding of new vertices for that polygon; ones that were not produced by the evaluation of the span at the steps in u and v as shown in FIG. 6.

Refer now to FIG. 7. What is shown there is an expansion of a portion of FIG. 6. In particular, portions of patches 16 and 17 are depicted, along with a portion of the mapped trimming curve 27. By "mapped" trimming curve, we mean the trimming curve 11 as mapped into the patches by the patch generation functions.

Two kinds of polygon vertices along patch boundaries are shown in FIG. 7. The open (or hollow) circles correspond to the mapping into the patches of: a) the points of intersection of the dotted lines of FIG. 6 with the span boundaries, and b) the points of intersection of the dotted lines with themselves. The closed (or solid) circles correspond to "extra" vertices that are added by evaluating additional (u,v) pairs along the span boundary. These extra points divide each step of delta u into equal subportions; the steps of delta v are similarly divided. It is common for the user to have some degree of control over the process of adding these extra vertices.

FIG. 7 also shows polygon vertices along the mapped trimming curve 27. It is clear from an examination of the figure that a good many extra vertices have been added to the polygons as part of the trimming process. We shall have much to say about this, and turn now to FIG. 8, which is a further expansion of that portion of the mapped trimming curve 27 pertaining to patch 17.

There are basically two topics that are of interest in connection with FIG. 8. The first is where the solid black squares come from. They are points along the mapped trimming curve 27 that are taken to be polygon vertices for polygons that are crossed by the mapped trimming curve 27. It will be recalled (see FIG. 5) that the trimming curve 11 is composed of segments. For the particular trimming curve 11 in FIG. 5 that serves as the basis of our example here in FIG. 8, segments $S_6$ through $S_8$ are those that trim patch 17.

Segments $S_6$ through $S_8$ (as well as all the other segments of that or any other trimming curve) are evaluated by finding, for each segment, a delta t that ideally produces steps in u and v that are each roughly equal to the distance, in uv space, between the points along the span boundary that correspond to an open circle and its nearest solid black circle neighbor on patch boundaries of FIG. 7. This business of selecting the delta t's is influenced by the user's choices made in connection with extra vertices for patch boundaries. In reality (and in contrast with the ideal case), the evaluation of the trimming curve 11, as described above, produces many (u,v) pairs that are spaced too close together to be useful. A further refinement is to examine the pairs produced by the evaluation of the parametric functions (for the example at hand these are $F_{u6}$ & $F_{v6}$, $F_{u7}$ & $F_{v7}$, $F_{u8}$ & $F_{v8}$) and suppress pairs insufficiently distant from their predecessors. The solid black squares of FIG. 8 (and those of FIG. 7, too) result from evaluating the patch generation functions at these refined (u,v) pairs.

The second thing that is of interest in FIG. 8 is the open squares. These represent the intersection of the mapped trimming curve 27 and the polygon edges. Rather than find the intersections in XYZ space, the corresponding point of intersection is found in uv space and then mapped into XYZ space. Specifically, what is found is the intersection of two straight line segments in uv space. One of the straight line segments is between two consecutive refined (u,v) pairs along the trimming curve 11. The other straight line segment would be a portion (e.g., 28 or 29 in FIG. 6) of the dotted lines or span boundaries of FIG. 6.

Before leaving FIG. 8, notice also the dotted lines that represent polygon portions and entire polygons that are determined to be invisible by the trimming process, and so are not displayed.

We turn now to FIG. 9. That figure is a simplified pseudocode description of activity performed by a transform engine portion of a high performance graphics system hardware apparatus. That hardware apparatus is the subject of description that appears in a later portion of this Specification and its Figures. The activity mentioned above is primarily the trimming of polygons as illustrated in FIG. 8. FIG. 9 may be understood as a condensed road map for accomplishing the type of trimming described in connection with FIG. 8.

In a preferred method the graphics system is capable of displaying several B-spline surfaces, each of which may be variously trimmed Each surface would generally be composed of a plurality of patches The trimming activities occur at the level of polygon handling within each patch. Accordingly, steps 1 and 2 (in conjunction with steps 15 and 16) of FIG. 9 apply the process to be described in connection with steps 3-14 to each of the patches in all of the surfaces. Step 2 is accomplished in software executed by the computer associated with the graphics system. Among other things, step 2 divides the surface into patches, selects a patch to be rendered, computes $u_{min}$, $u_{max}$, $v_{min}$, and $v_{max}$ for the associated span of the uv space, and decides which segments of which trimming curves will be needed for trimming the patch. Steps 3-14 generate trimmed polygons vertices that can be displayed by a polygon rendering mechanism in the hardware of the graphics system.

We now consider the activity within the range of the FOR loop of steps 3 through 14. That activity includes the primary generation of the various polygons (as indicated by steps 3 and 14), and their subsequent (and immediate) trimming (as indicated by steps 4 through 13).

Figure 10:
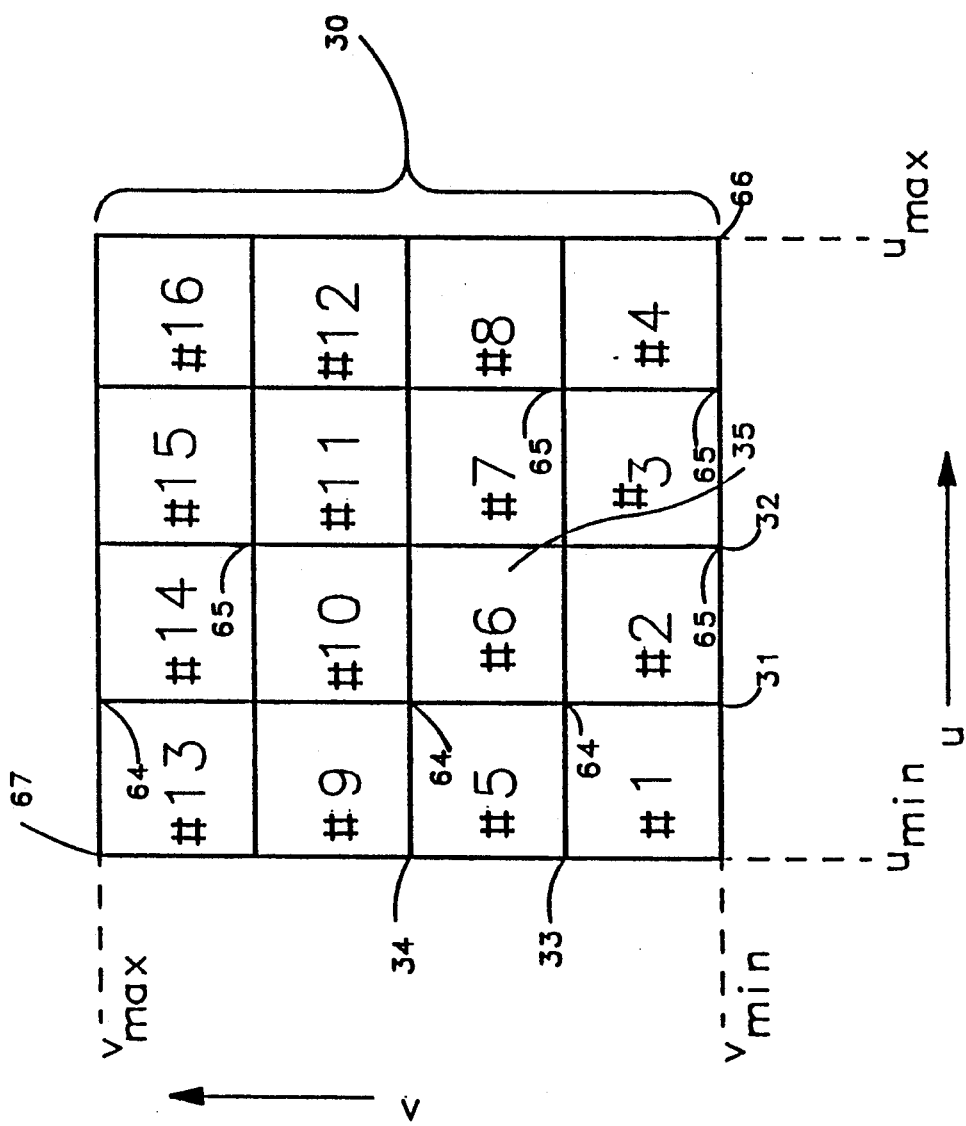
FIG. 10 depicts the order within a span in which subspans are taken to generate the approximating polygons for the surface in XYZ space.

The general order of polygon generation within a patch is illustrated in the example span 30 of FIG. 10. That span is partitioned, in this example, into sixteen subspans; one for each untrimmed polygon to be generated. The size of each subspan is determined in accordance with the user's instructions pertaining to the desired visual smoothness of the surface. In a preferred method the polygons are generated by a technique called forward differencing, which does not require the explicit calculation of the u and v values for the boundaries of each of the subspans. Forward differencing is preferred because it is faster than evaluating the patch generation functions at each of the subspan corners. For a description of forward differencing see Foley and Van Dam, pages 535-536.

The trimming activities that are to follow require the use of clip limits that correspond to the subspan for the polygon being generated. As usual, the term "clip limits" refers to a window of interest. Objects within the window are retained, while those that fall outside are discarded. The clip limits that will be of interest to the trimming described herein are the subspan boundaries in uv space that are associated with the generated polygons.

Unfortunately, as noted above the operation of computing polygon vertices in XYZ space through forward differencing does not explicitly provide the u and v values that are the subspan boundaries. If the clip limits noted above are to be used, then they must be found separately. Step 4 computes the clip limits (in uv space) for the polygon currently being generated and trimmed FIG. 9A includes a subspan 35 having clip limits $u_{left}$, $u_{right}$, $v_{top}$ and $v_{bottom}$. Subspan 35 could, for example, correspond to subspan #6 in FIG. 10: $u_{left}$ would be the value 31, $u_{right}$ would be the value 32, $v_{top}$ would be the value 34, and $v_{bottom}$ would be the value 33.

Referring to FIG. 10, note that finding the clip limits for the various subspans requires determining the u values 31, 32, ... and v values 33, 34, ... that partition the u and v axes. In a preferred embodiment these are 32-bit floating point binary numbers. One can envision a procedure for independently finding the four corners of any selected subspan. Any such procedure such be avoided unless it can be absolutely guaranteed that the same (u,v) pair (i.e., their bit patterns are identical) is always obtained for a shared corner (i.e., u value 31 and v value 33 describe a common corner for subspans #1, #2, #5 and #6 in FIG. 10), regardless of which subspan is currently of interest. Rather than make such guarantees for independently selected subspans, a preferred method, described next, allows the polygons to be generated at separate times while ensuring, by saving certain principal values of interest, that common corners have identical u values and identical v values.

As shown in FIG. 10, the order of polygon generation is from from left to right within rows, and then row-wise from bottom to top. Step size values (delta u and delta v) are found as previously described. While traversing a row (say, from subspan #2 to subspan #3) the $u_{right}$ of subspan #2 is saved and reused as the $u_{left}$ of subspan #3. At the beginning of a row $u_{min}$ for the span is taken (exactly) as $u_{left}$. Along a row a new $u_{right}$ is found by adding delta u to the old value of $u_{right}$. At the end of the row $u_{max}$ for the span is taken (exactly) as $u_{right}$. The values $u_{min}$ and $u_{max}$ arise when the B-spline generation software segments a surface into patches (see FIG. 1).

Upon starting the first row $v_{min}$ is taken (exactly) to be $v_{bottom}$. The value for $v_{top}$ is found by adding delta v to $v_{bottom}$. Thereafter, at the start of a new row the old value of $v_{top}$ is saved and reused as the new $v_{bottom}$. The new $v_{top}$ is found by adding delta v to the old value of $v_{top}$. When doing the very top row of subspans $v_{max}$ is taken (exactly) to be $v_{top}$.

Figure 11:
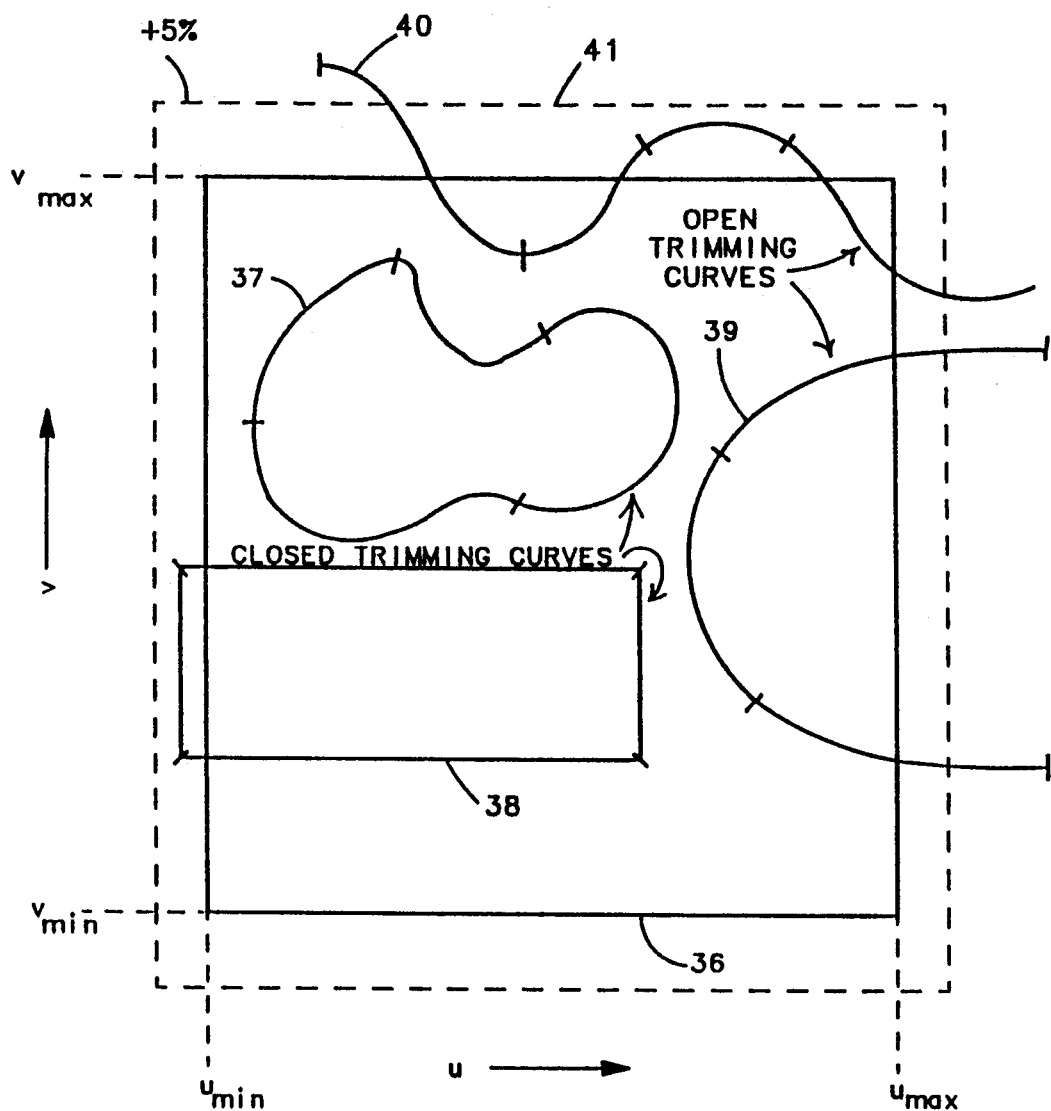
FIG. 11 illustrates several types of trimming curves defined upon a span, and indicates the presence of a guard region around the span to assist in avoiding arithmetic rounding errors.

Step 5 (in conjunction with step 10) of FIG. 9A may be better understood with reference to FIG. 11. That figure shows a span 36 crossed by a number of associated trimming curves 37-40. Recall that trimming curves are generally defined as segmented B-splines. When considering what actions to take in trimming a particular patch, only those trimming curve segments that are inside the associated span need be considered. In accordance with what was said in connection with step 2 of FIG. 9, a mechanism in the software of the graphics system will associate one or more lists of trimming curve segments with each span. If, for example, the patch for the span 36 of FIG. 11 were to be rendered, then four lists of trimming curve segments (i.e., their B-spline descriptions), the particular patch generation functions, the span definition, as well as some other stuff, would be transmitted to the mechanism that executes steps 3-14 of FIG. 9. Of the four lists of trimming curves in our example, the two associated with trimming curves 37 and 38 will be marked as describing "closed" trimming curves, while the two lists for trimming curves 39 and 40 will be marked as "open". By this we mean that the lists for trimming curves 37 and 38 describe complete curves that close upon themselves. However, portions of trimming curves 39 and 40 may be discarded as having no effect upon the trimming of the patch produced by rendering span 36. (The discareded portions may, however, be needed when rendering some other patch, and will appear in lists accompanying the span for that other patch.) Open trimming curves must start and end outside of their associated span. In a preferred method the number of trimming curve segments to be included in a list for an open trimming curve will be increased to include starting and ending segments that are "clearly" inside the span or "clearly" outside the span, beyond any possible doubt or error that could be introduced by roundoff errors. This may be accomplished, for example, by considering the span to be, say, five percent bigger than it really is, as shown by the dotted line 41.

We turn now to step 6 of FIG. 9, which (in conjunction with step 9) concerns the notion of straight line segments along a trimming curve. The task of trimming is going to involve finding many points along each trimming curve. Recall, for example, FIG. 8; all of the open and solid squares along the mapped trimming curve 27 have to be found (locally, as it were) as a part of the trimming process. In particular, the "straight line segments" of step 6 of FIG. 9 correspond to straight lines between the solid squares of FIG. 8. Implicit in step 6 is the finding of (u,v) pairs which, when evaluated by the patch generation functions 4, will produce the solid squares. It is the finding of those (u,v) pairs that is of interest at the moment.

It may be recalled that the mapped trimming curve 27 of FIG. 8 corresponds to segments $S_6$ through $S_8$ of the trimming curve shown in FIG. 5. Recall also that the same trimming curve is shown in uv space in FIG. 6. The (u,v) pairs that we presently seek belong to the same uv space as shown in FIG. 6. We last used FIG. 6 in connection with a discussion of how polygons arose; here a similar operation is going to produce a separate collection of (u,v) pairs to construct the straight line segment approximation of each B-spline segment of each trimming curve.

What is desired are (u,v) pairs along the trimming curve having approximately the same spacing therebetween as the extra vertices added to the span boundaries for polygon generation. That is, the steps in u along the trimming curve should be no larger than the distance in u between the extra vertices. If there are no extra vertices, then the maximum distances should be taken as the distance between corner vertices. A similar requirement applies to steps in v along the trimming curve. This collection of (u,v) pairs is a separate collection of points different from any other, say, that used for polygon generation. The steps along the trimming curve will correspond to the solid squares of FIG. 8. They will be used to determine additional (u,v) pairs that correspond to the open squares of FIG. 8. We now describe how the initial steps along the trimming curve are found.

Recall that the trimming curves are described by parametric equations having t a their independent variable. Knowing what step sizes in u and v are desired does not immediately imply a step size in t for actually evaluating the trimming curve functions. Furthermore, it would be desirable if the technique of forward differences could be used to evaluate the trimming curve functions, just as was described for the patch evaluation functions. That requires a uniform step size in t. So, what is needed is a step size in t that remains unchanged throughout the evaluation of the trimming curve segment, and that produces a sufficiently dense collection of (u,v) pairs for use as the solid squares of FIG. 8.

The basic idea is to evaluate each segment of each trimming curve at some selected (and manageably small) number of points. The largest of the resulting increments in u and the largest of the resulting increments in v are each saved. These increments are compared to the respective distances in u and v between the extra vertices along patch boundaries. If the comparison is favorable the desired step size in t has been found. If the comparison is unfavorable, then the step size in t is adjusted in accordance with the ratio of the largest resulting step size and the desired step size. This determination process is performed separately for u and v, resulting in two candidates for a step size in t. The smaller of the two step sizes is selected.

Figure 12A:
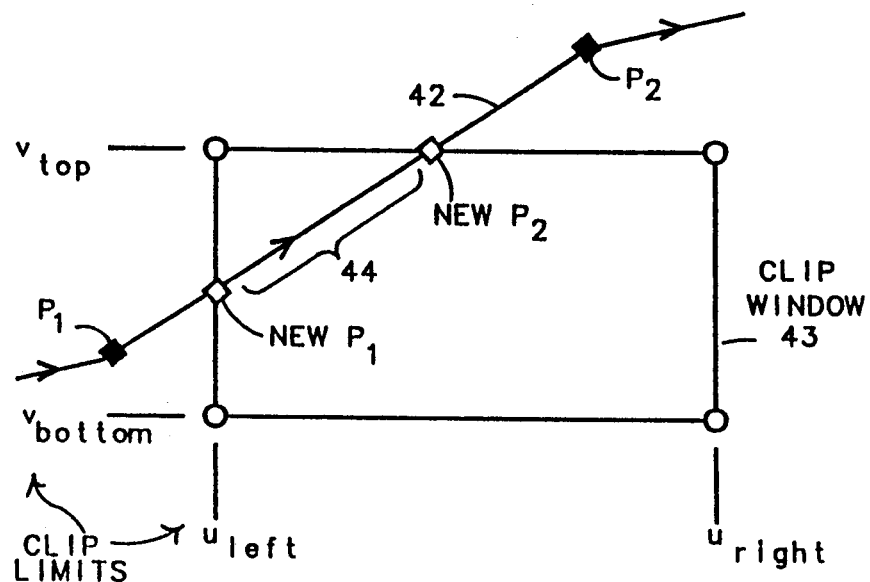
FIGS. 12A-B depict how a clipping mechanism operates upon approximating straight line segments of trimming curves that cross subspans to produce points of intersection between the straight line segments of the trimming curve and the boundaries of the subspan.

Step 7 in FIG. 9 may be understood with reference to FIG. 12 and an appreciation of the Cohen & Sutherland clipping algorithm. (For a description of that algorithm, see pages 146–149 in Foley and Van Dam.) FIG. 12A depicts a straight line segment 42 (having a direction that is from $P_1$ to $P_2$) that crosses a clip window 43 of interest. The purpose of finding a uniform step size in t and using the forward differencing to evaluate the trimming curve function (in the direction of increasing values of t) is to find a sufficient number of points along the trimming curve. These points are the solid squares of the figures, and the directed straight line segments between them are a close approximation of the ideal trimming curve described by the B-spline functions. Clipping finds the points of intersection (if there are any) between each staight line segment 42 and the clip window 43. This allows the determination of exactly what part 44 of the staight line segment 42 lies within the clip window 43. In the example of FIG. 12A that part 44 is the line between $NEWP_1$ and $NEWP_2$. $NEWP_1$ and $NEWP_2$ are computed by the clipping process. The subscripts indicate that the line segment 44 has a direction. As will become apparent, the trimming method to be described uses the notion of directed motion along the trimming curves. Simply put, as you travel along the trimming curve (or its straight line approximation) the stuff on the right gets trimmed away.

The Cohen & Sutherland clipping algorithm mentioned above is employed in conjunction with a number of enhancements. With reference now to FIG. 12 and to the way the Cohen & Sutherland clipping algorithm is described at pages 146–149 in Foley and Van Dam, the preferred method incorporates the following improvements:

1. The clip limits are checked in the order $u_{left}$, $u_{right}$, $v_{bottom}$, $v_{top}$ because this is the order in which the polygons are generated (i.e. left to right within a row and row-wise from bottom to top).

Figure 12B:
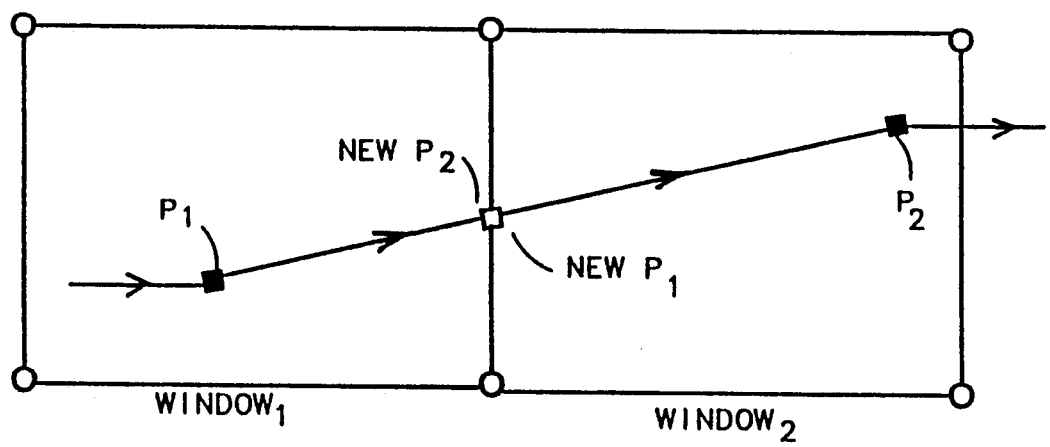

2. Depending on the relative position of the clip window and the straight line segment, either a $NEWP_1$ or a $NEWP_2$, or both, is computed. (FIG. 12 shows only two of many possible situations.) The computation of such an intersection point at any stage of the clipping algorithm is always done relative to the original $P_1$ to ensure that identical intersection points are computed for adjacent clip windows, as shown in FIG. 12B. When considering window$_1$ and the straight line segment from $P_1$ to $P_2$, the intersection point labeled $NEWP_2$ in window$_1$ will be computed. When considering the same straight line segment for window$_2$, the intersection point labeled $NEWP_1$ in window$_2$ will be computed. The numerical values computed for $NEWP_1$ must be identical to the numerical value computed for $NEWP_2$. The equations $$NEWV_2 = v_1 + ((u_{right} - u_1)/(u_2 - u_1))(v_2 - v_1)$$

$$NEWV_1 = v_1 + ((u_{left} - u_1)/(u_2 - u_1))(v_2 - v_1)$$

where:

$u_1$ and $v_1$ are the coordinates of $P_1$ $u_2$ and $v_2$ are the coordinates of $P_2$ give the value of the v coordinate of the intersection point for the two windows. The u coordinate is $u_{right}$ for window$_1$ and $u_{left}$ for window$_2$.

3. After clipping against the left, right, bottom, and top boundaries it is possible (because of floating point roundoff errors) for one coordinate of either $NEWP_1$ or $NEWP_2$ to be slightly outside of the clip window. This is corrected by moving that outside coordinate of $NEWP_1$ (and/or $NEWP_2$) to the clip boundary after clipping. This check is made for all four clip boundaries. (Roundoff errors could just as easily move one coordinate of the final points to the inside of the clip window. This case does not cause problems later in the trimming activity, and may be ignored.)

4. If the trimming curves are represented as B-splines, it will typically be the case that the (u,v) pair obtained when a given segment is evaluated at the end of its span (i.e., for the largest value of t in that span) will not exactly equal the (u,v) pair obtained when the next segment is evaluated at the beginning of its span (i.e., for the smallest value of t in the other span). This may be the result of floating point roundoff errors or of the failure of the B-spline approximations to converge exactly at their "joint" between segments. This problem is avoided by using the first point of the later segment in place of the last point of the former segment. Thus, the last straight line segment of the straight line segment approximation for a given trimming curve segment goes from the next to last point of that segment to the first point of the next segment.

5. Typically, $P_2$ of a given straight line segment becomes $P_1$ of the next straight line segment. When this occurs, the old value of $P_2$ can be copied into $P_1$. Then the clipper can save information about the position of $P_2$ relative to the clip window and avoid recomputing this information.

6. The clipper sets three flags (which will be used later):

ACCEPT:=TRUE if the straight line segment from $P_1$ to $P_2$ is partially or completely inside the clip window;

CNEWP1:=TRUE if a new $P_1$ was computed (i.e., $P_1$ was outside the clip window); and CNEWP2:=TRUE if a new $P_2$ was computed (i.e., $P_2$ was outside the clip window).

7. If the ACCEPT flag is TRUE the clipper updates $NEWP_1$ and $NEWP_2$. If $P_1$ is on or inside the clip window then $NEWP_1 = P_1$. $P_2$ is handled similarly.

Refer now to step 8 of FIG. 9. After each straight line segment is clipped against the current clip window, information about points $NEWP_1$ and $NEWP_2$ is saved in a list of tables if the ACCEPT flag is TRUE. In general, a trimming curve can have many points within the current clip window. (FIG. 8 is helpful here; it shows polygon vertices along the mapped trimming curve 27. In each subspan the clipping process returned a plurality of points for the trimming curve.) A trimming curve may enter a clip window and continue within it for many points before exiting. It may exit and then reenter. It might even simply start (for t=0) some place in the middle of the clip window. A trimming curve might intersect a clip window at exactly one corner of the window. In terms of tables added to the list then, a given trimming curve may produce one or more tables to be added to the list. Because trimming curves have a direction associated with them (increasing values of t), it is useful to distinguish among: a) points of intersection along the boundary of a clip window where a trimming curve enters the window; b) points along a trimming curve that are inside the clip window; and c) points of intersection along the boundary of a clip window where a trimming curve leaves the window. These points will be called "BEGIN", "MIDDLE", and "END" points, respectively. In general a clip window can be cut by several trimming curves. It is desirable to group the tables for each individual trimming curve into separate circularly linked sublists within the larger list of all of the tables generated for a particular clip window.

The general format of the tables is shown in FIG. 9. The first two entries 45 and 46 in a table are the binary floating point values of the u and v coordinates for the point of interest (either $NEWP_1$ or $NEWP_2$). The third entry 47 contains three parts: either zero or a nonzero trimming curve number (an 8-bit integer); either zero or a nonzero B-spline segment number (also an 8-bit integer) identifying the trimming curve on which the point in uv space lies; and six flag fields. (Zeros in the first two parts indicate special cases described later in a more detailed description of a preferred implementation.) The six flag fields are:

FF1 A two bit field indicating whether this table is for a "BEGIN", "MIDDLE", "END", or "OTHER" point. "OTHER" points include corners and extra vertices, as will be described below.

FF2 A two bit field indicating which edge of the clip window (i.e., left, right, bottom, or top) the point lies upon. This field is used mainly for tables describing corners and extra vertices.

FF3 A one bit field indicating if this table should be skipped. This bit will be set if this table is one of the special cases to be described in connection with step 11 of FIG. 9. This flag is called the SKIP flag.

FF4 A one bit field which will be used in step 12 of FIG. 9 to indicate that this table has been handled already. This flag is called the MARK flag, and is initially FALSE.

FF5 A one bit field which will be used in step 12 of FIG. 9 to indicate that this table is the first table to be handled. This flag is called the START flag, and is initially FALSE.

FF6 A one bit field which will be determined in step 11 of FIG. 9 and which indicates if the vertex in XYZ space corresponding to this table remains present "ON" the surface (it has not been trimmed away) or is absent from, or "OFF", the surface (it has been trimmed away). This flag is called the ON flag.

(Remaining present ON the surface does NOT mean the vertex will actually be visible. Hidden surface removal, back cull and clipping operations can prevent a point that is present ON the surface from ultimately being displayed. On the other hand, a point that is absent OFF the surface is NEVER visible.)

We shall have many future occasions to refer to the presence or absence of a vertex, or to whether it is ON or OFF the surface. In the same way it will be convenient to refer to polygons and entire patches as either present or absent, ON or OFF. Polygons and patches do not have individual ON flags of their own; their presence or absence will be determined by the presence or absence of certain vertices within them. The ON flags of those important vertices are saved as they are encountered.

The fourth entry 48 contains the Wrap Address and the Next Address. Nonzero Wrap Addresses are the circular links in an otherwise linear (i.e., physically ordered) list of tables. A Wrap Address of zero indicates that the next physical table is also the next logical table in the list. Tables are inserted onto the end of the list of tables in an orderly manner as trimming curves are traversed in the direction of increasing values of t. To make the desired circularly linked sublist for a trimming curve it is merely necessary to insert the address of the first table for that trimming curve into the Wrap Address of the last table for that trimming curve.

The Next Address is determined by steps 11 and 12 in FIG. 9. It links the tables into another list used to display portions of polygons that are present.

As part of the discussion of step 8 of FIG. 9, it is appropriate to describe the criteria used to build the list of tables in response to information provided by the clipper. In general, depending on the position of the line from $P_1$ to $P_2$ relative to the clip window, it will be necessary to add zero, one, or two tables to the list. The following decision tables describe how this is done. In these decision tables the flag INSIDE is used to remember if $P_2$ is inside or outside the clip window.

| DECISION TABLE FOR THE FIRST ($P_1,P_2$) PAIR ALONG EACH TRIMMING CURVE | | |
|---|---|---|
| If ACCEPT = FALSE then INSIDE := FALSE | | |
| If ACCEPT = TRUE then | | |
| CNEWP1 | CNEWP2 | |
| F | F | If the current trimming curve is an open loop then add to the list a BEGIN table for NEWP$_1$, else do nothing. If P$_2$ is the last point on an open loop trimming curve then add to the list an END table for NEWP$_2$, else add a MIDDLE table for NEWP$_2$. INSIDE := TRUE. |
| F | T | If the current trimming curve is an open loop then add to the list a BEGIN table for NEWP$_1$, else do nothing. Add to the list an END table for NEWP$_2$. INSIDE := FALSE. |
| T | F | Add to the list a BEGIN table for NEWP$_1$. Add to the list a MIDDLE table for NEWP$_2$. INSIDE := TRUE. |
| T | T | If NEWP$_1$ < > NEWP$_2$ then add to the list a BEGIN table for NEWP$_1$ and an END table for NEWP$_2$, else do nothing. INSIDE := FALSE. |

| DECISION TABLE FOR THE REMAINING ($P_1,P_2$) PAIRS OF EACH TRIMMING CURVE | | |
|---|---|---|
| If INSIDE = TRUE then | | |
| CNEWP1 | CNEWP2 | |
| F | F | If P$_2$ is the last point on an open loop trimming curve then add to the list an END table for NEWP$_2$, else add a MIDDLE table for NEWP$_2$. |
| F | T | Add to the list an END table for NEWP$_2$. INSIDE := FALSE. |
| T | T/F | Can't Happen. |
| If INSIDE = FALSE then | | |
| If ACCEPT = FALSE then go to next (P$_1$,P$_2$) pair | | |
| If ACCEPT = TRUE then | | |
| CNEWP1 | CNEWP2 | |
| F | T/F | Can't Happen. |
| T | F | If P$_2$ is the last point on an open loop trimming curve then add to the list an END table for NEWP$_2$, else add a MIDDLE table for NEWP$_2$. INSIDE := TRUE. |
| T | T | If NEWP$_1$ < > NEWP$_2$ then add to the list a BEGIN table for NEWP$_1$ and an END table for NEWP$_2$, else do nothing. |

Steps 9 and 10 cooperate with steps 6 and 5, respectively, described above. The result of these nested FOR loops is the division of each timming curve into straight line segments. Those are then clipped by step 7 against the subspan whose polygon is to be rendered. Step 8 builds a list of tables describing the clipped straight line segments.

In steps 11(a)–(d) the list of tables produced at step 8 is processed in four ways. The first of these is an inspection by step 11(a) for the two special cases shown in FIGS. 13A-B.

Figure 13A:
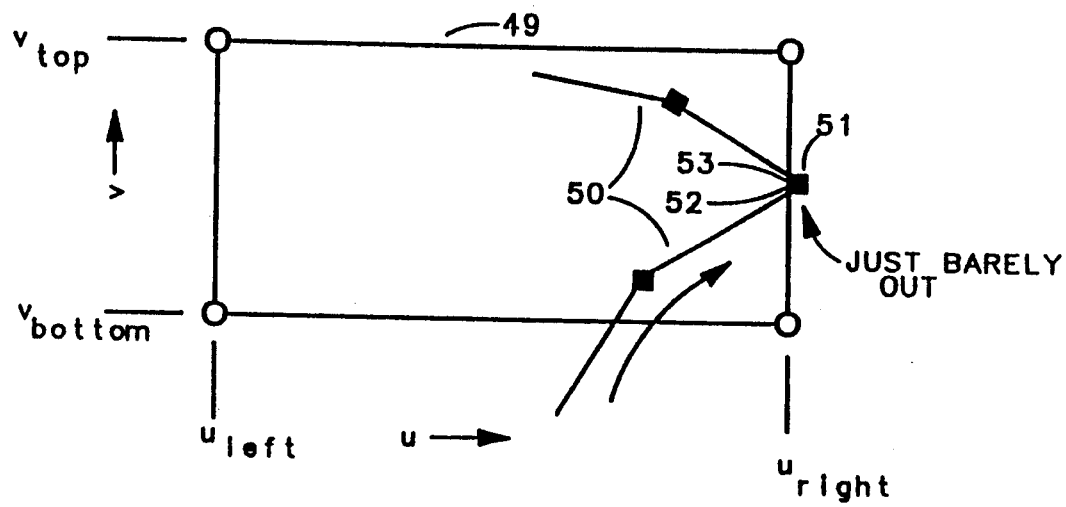
FIGS. 13A-B describe certain special cases when trimming curves exhibit points in uv space that are very close to the boundaries of the subspan of interest.

Referring now to FIG. 13A, what is shown there is a subspan 49 and a trimming curve 50 having a point 51 that falls "just outside" the clip window. According to the clipping algorithm described in step 7 of FIG. 9, a point of intersection 52 will be calculated for where the trimming curve 50 "goes out" of the clip window 49. According to the example, the trimming curve comes right back in again. The clipper will dutifully produce another point o intersection 53. If the point 51 is sufficiently close to the clip limit (which in the example is the right-hand edge, but it could be an edge) the finite resolution of the numbers used in the calculations can result in both the exit and entrance points lying on top of one another. This is what FIG. 13A is all about; within the degree of arithmetic precision in use, points 52 and 53 are the same point. This is really what we mean by "just barely" outside.

When the situation described above occurs, two tables having certain properties will be consecutively added to the list. In particular, the first will be an END table (see FF1 in connection with step 8 of FIG. 9) and the second will be a BEGIN table. Furthermore, both tables will have exactly identical u values and exactly identical v values. This state of affairs is the first special case associated with the processing of the list of tables by step 11(a).

The first special case is found by inspecting each of the circularly linked sublists associated with the trimming curves. If any sublist contains logically adjacent (i.e., with the Wrap Address taken into proper account to produce correct logical ordering) BEGIN and END tables each containing the same identical (u,v) pair, then each of those tables is converted to a MIDDLE table.

Figure 13B:
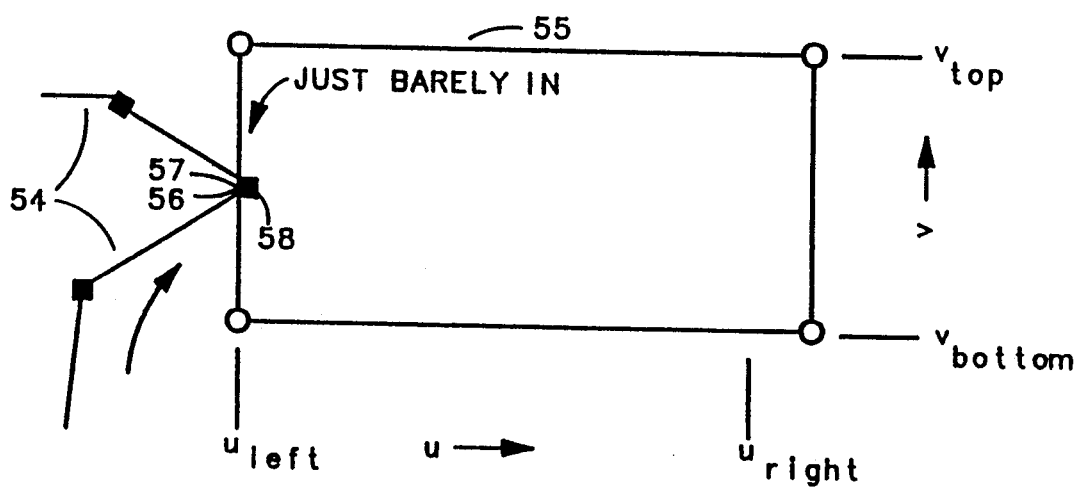

The second special case that is checked for is depicted in FIG. 13B. This case is generally analogous to the first special case, except that the trimming curve 54 extends "just barely" into the clip window 55. In particular, the finite resolution of the numbers used in the calculation of points of intersection will produce a BEGIN table and an END table for points 56 and 57 having the same (u,v) pair. However, in this case the BEGIN and END tables will be separated by a MIDDLE table for point 58.

The second special case is found in step 11(a) by an inspection of the list for sublists containing BEGIN—MIDDLE—END sequences having BEGIN and END tables containing the same identical (u,v) pair. When such a sequence is found the SKIP flag (refer to step 8 of FIG. 9) is set in all three tables. The net effect of this upon later processing of those tables is their effective deletion; they are simply ignored.

In step 11(b) the list of tables is processed to make four new sublists; one sublist for each edge of the clip window, with each such sublist enumerating the trimming curves which cross the associated edge. These new edge sublists are formed in place, as it were, by using the NEXT ADDRESS field of the tables to link the edge sublists together. (This will be only an intermediate use of the NEXT ADDRESS field, not its final use.)

Only BEGIN and END tables without their SKIP flags set are included in the edge sublists. In forming the edge sublists special attention will be paid to cases where the (u,v) pair in a BEGIN or END table is also a corner point of the clip window. In this connection it will be helpful to refer now to FIG. 14, which depicts a clip window crossed by several trimming curves. A BEGIN or END table whose (u,v) pair also (by chance) describes the corner point I goes into the edge sublist for the top edge 59. Similarly, a BEGIN or END table at corner II goes with the left edge 60. A BEGIN or END table at corner III goes with the bottom edge 61. In like fashion, a BEGIN or END table at corner IV goes with the right edge 62.

Once formed, each edge sublist is sorted by either ascending or descending values of either u or v, depending upon which edge the sublist represents. The attributes BEGIN and END do not influence the sorting. The edge sublist for the left edge is sorted according to decreasing values of v. The edge sublist for the bottom edge is sorted according to increasing values of u. The edge sublist for the right edge is sorted according to increasing values of v. The edge sublist for the top edge is sorted according to decreasing values of u.

At step 11(c) the list of tables is processed to interleave the four edge sublists with tables in the main list for corners and extra vertices to produce a new circular ordering in the list. This is the final use of the NEXT ADDRESS field. The interleaving begins (arbitrarily) with corner vertex I, and proceeds counterclockwise around the boundary of the clip window. The NEXT ADDRESS field of each table for a point along the boundary is linked to the next point further along the boundary, whether that be an extra vertex, or an intersection with a trimming curve. It could even be the case that the next vertex is the next corner. This reordering is represented in FIG. 14 by the arrows connecting the points labeled as C's, X's, B's and E's. Beginning arbitrarily with vertex I, the resulting ordering is C-X-E-X-X-C-X-B-X-E-C-B-C-E-B-C. The only types of tables included in this reordering with the NEXT ADDRESS field are corners, extra vertices, and the BEGIN and END intersection point tables; left undisturbed are the sublists for each trimming curve enumerating the points along each trimming curve within the clip window (the MIDDLE's between the BEGIN's and END's).

It might be observed at this point that nothing particular has been said about the way that tables for corner vertices and tables for extra vertices are kept in the overall list of tables for the clip window of interest. Clearly, some mechanism is needed for adding and later finding such tables, so that the interleaving described above can be accomplished. Various techniques are well known for accomplishing this sort of thing, and the one used in any particular embodiment will depend, in large part, upon the inclinations of the designer. In the present embodiment they are located in their own linked sublists identified by associated pointers.

Step 11(d) of FIG. 9 calculates the ON flag for each table in the circularly linked list just described above in connection with FIG. 14 and step 11(c) of FIG. 9. The ON flag indicates if a vertex remains present ON the surface or is trimmed away. What interests us here is how the ON flag may be calculated. Simply put, this is done by finding a point where a trimming curve leaves the subspan. By definition, every point on a trimming curve is assumed to be present. Trimming involves the further assumption that everything in a subspan that is to the left of the trimming curve (while proceeding along the trimming curve in the direction of increasing t) is also present. Accordingly, if we start at a point on the subspan boundary that is also the exit of a trimming curve, the next vertex in the counterclockwise direction, and all subsequent vertices until a trimming curve is encountered, are also present. The reader may satisfy himself as to the relationship between "to the left of (with increasing t)" and "counterclockwise around the subspan" by an appeal to FIG. 14. Pick a vertex that is present ON the surface and try going both clockwise and counterclockwise.

ON flags are calculated by picking any END table as a starting point, say, the point 63 in FIG. 14. Its ON flag already designates ON. Then the circular list of tables is traversed, and each ON flag is also set to designate ON, until a BEGIN table is encountered. The ON flags for subsequent tables are cleared to designate OFF until an END table is encountered. This process is continued until the initial END point 63 is again encountered. If this is carried out on the example shown in FIG. 14, beginning with the END point 63, the following sequence of ON flags will be obtained (1/0=ON/OFF): 1, 1, 1, 1, 1, 1, 0, 1, 1, 1, 0, 1, 1, 0, 0.

It might be the case that the circularly linked list for a subspan contains no BEGIN or END tables. This can happen in two different ways. First the subspan might have no trimming curves associated with it at all. Such a subspan will have only tables for corners and extra vertices. In the second case a subspan might wholly contain one or more trimming curves. (These might touch or coincide with the subspan boundaries, but not cross them, and the effect will be the same when the curve is entirely inside without touching.) Such a subspan will give rise to a list having tables for corners, extra vertices and MIDDLE's for the trimming curve(s).

When rendering a polygon corresponding to the first case above the presence of that polygon will be determined by the presence of adjoining polygons; it will be either totally present or totally absent. In the second case the trimming curve is smaller than the smallest "unit of interest" (i.e., the polygon). The trimming curve will be ignored and the entire polygon tentatively retained. However, it does not necessarily follow that the polygon will remain present; it might itself be within a larger trimming curve, and so be trimmed away. In the second case, as in the first, the presence of the polygon will depend upon the presence of adjoining polygons.

The second case above remains as described even when the interior trimming curve itself contains another trimming curve. Presumably this situation corresponds to alternating regions of presence and absence upon the surface. However, such features are too small to be seen within the chosen polygon size. Do not confuse that situation with the case when polygon size is decreased to where the trimming curves begin to cross subspan boundaries. That simply produces normal trimming, as usual.

It is clear from the foregoing that during the processing of each individual polygon some mechanism is needed to remember whether certain polygons were present or absent. The mechanism will involve saving the values of the ON flag for certain of the tables for selected subspans during the processing of a patch. Referring now to FIGS. 10 and 14, recall that subspans are taken in a definite order. For the first subspan within each row the ON flag for vertex IV 64 is saved for use in processing the next row. Within a row the ON flag for vertex III of each subspan is temporarily saved for use in rendering the next polygon in that row. In addition, the ON flag for vertex III 66 of the last subspan of the first row is saved for use in processing a patch to the right of the current patch. (Although we haven't said so to this point, a surface is made up of row and columns of patches; FIG. 10 could refer to that as easily as to subspans within a patch.) Similarly, (to accommodate rows of patches) the ON flag for vertex I 67 of the first subspan of the last row of subspans within a patch is also saved, after being complemented if there is a BEGIN or END table exactly coincident with vertex I. Such saving is also for use in processing a subsequent patch; the complementing accounts for a special case explained in the paragraphs that follow.

Recall that in connection with step 11(b) of FIG. 9 it was said that a BEGIN or END table that by chance had the same (u,v) pair as vertex I would be included in the edge sublist for the top edge of the subspan. At step 11(c) it was said that the four edge sublists were interleaved counterclockwise around the subspan, beginning with vertex I. This means that in the special case where a trimming curve crosses a boundary by passing through vertex I 67 there are in the circularly linked list actually two tables describing vertex I; one for vertex I itself and one for the BEGIN or END coincident with vertex I. Each of those tables has an ON flag; special attention must be paid to how to interpret these in light of the rules by which they were set and the special case at hand.

There are three previously mentioned rules or conventions that apply to the ON flag. These are:

1. All points along a trimming curve are present ON the surface.

2. Proceeding along a trimming curve in the direction increasing values of t, points of the surface to the left of the trimming curve are present ON the surface.

3. Proceeding counterclockwise around the subspan, vertices immediately subsequent to an END have tables marked ON until the next BEGIN, which will also be marked ON. Similarly, vertices immediately subsequent to a BEGIN are OFF until the next END, which is itself marked ON.

Now suppose that a BEGIN is coincident with vertex I. According to rule 3, vertex I will be marked OFF (absent). However, the adjacent patch above the current patch is, by rule 2, ON (present). Hence, the value of the ON flag for vertex I 67 propagated to the next patch needs to be changed from OFF to ON.

Suppose that an END is coincident with vertex I. According to rule 3, vertex I will be marked ON. However, the adjacent patch above the current patch is, by rule 2, OFF. Hence, the value of the ON flage for vertex I 67 propagated to the next patch needs to be changed from ON to OFF.

Thus, the general rule for propagating the ON flag for vertex I 67 of the first subspan of the last row is: if there is in no BEGIN or END coincident with vertex I 67, propagate the unchanged value of the ON flag for vertex I 67. If there is a BEGIN or END coincident with vertex I 67, propagate the complement of the value of the ON flag of vertex I 67.

A specific rule is needed to calculate the ON flag for the very first vertex of an entire surface. Such a rule amounts to a convention, but should be consistent with the trimming operations that might apply to that very first vertex. For example, assuming that the very first vertex is always present ON the surface might not allow that vertex to be trimmed away. A convenient rule for the calculation of the ON flag of the very first vertex is to require that surface edges or portions thereof that are present (ON) are bounded by a trimming curve. With this approach the very first vertex can be assumed to be OFF. This assumed value is ignored if a trimming curve produces at least one BEGIN/END pair of vertex tables for the first polygon, since in such a case it is possible, as shown above, to compute the correct value of the ON flag for each vertex. In the absence of such a pair of vertex tables then the entire first polygon has indeed been trimmed away.

An interesting special cases arises when the trimming curve around the edge of the surface is the only trimming curve associated with the very first polygon. In that case the left and bottom edges of that polygon are coincident with that trimming curve, and two sets of vertices arise describing those two edges. One set says that the corners and extra vertices for those polygon edges are absent from the surface, while the vertices calculated for intersection of those edges with the trimming curve are, by definition, present ON the surface. By virtue of the way the clipper works, the OFF corner vertices are replicated as vertices on the trimming curve thus preserving the shape of the first polygon. The mechanism that processes the linked list of vertex tables, described below in connection with FIGS. 16 and 17, tolerates the duplicate descriptions, and will ignore the OFF edges and produce a polygon from the ON edges. It won't care that two of the OFF edges were the same as two of the ON edges. Thus is it that an OFF corner is present on an ON polygon.

Figure 15:
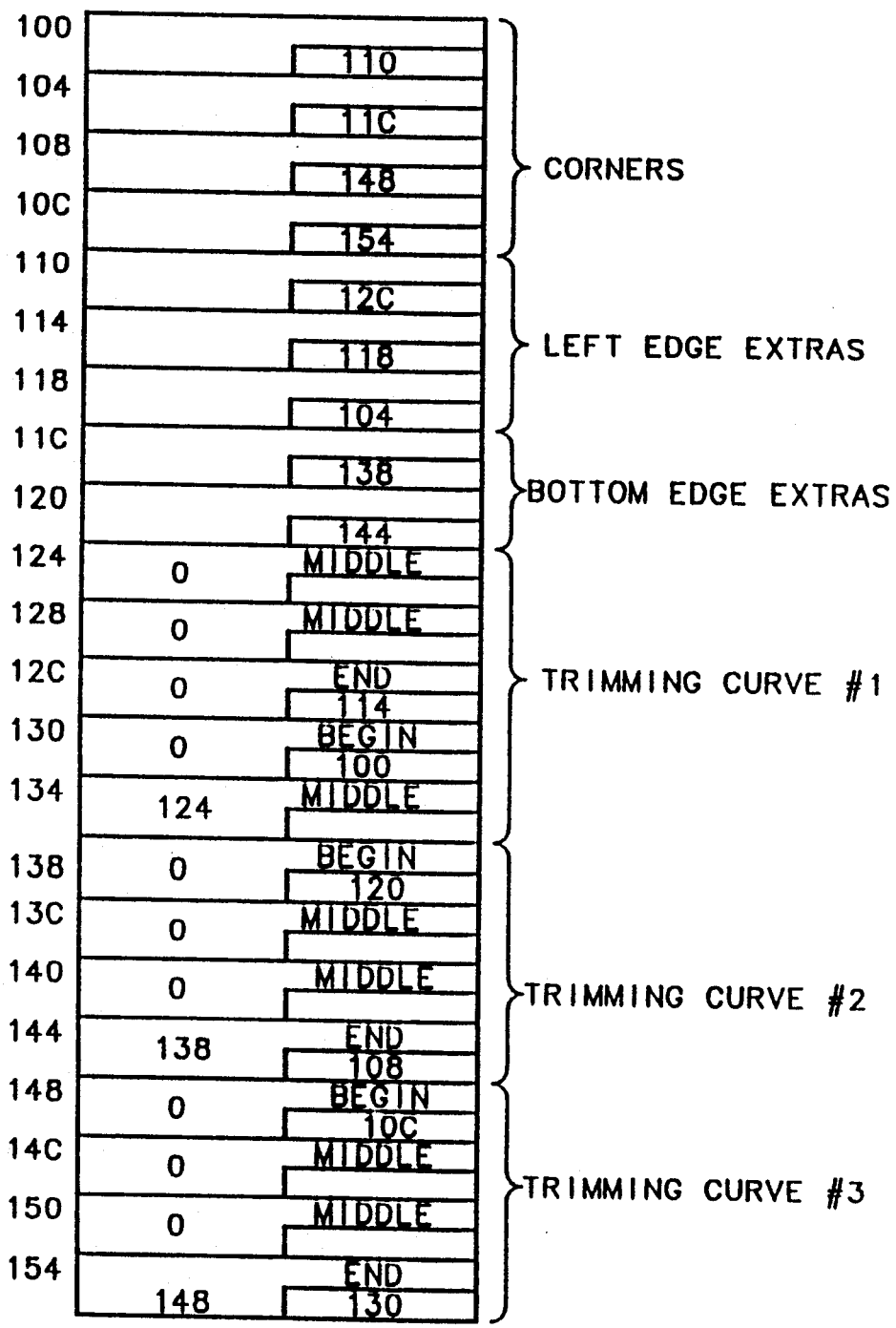
FIG. 15 is a simplified schematic representation of a linked boundary list and trimming curve sublists for the vertex tables corresponding to the example of FIG. 14.

Now consider step 12 of FIG. 9. Its task is to traverse the list of tables. Step 11 added to the list information about what original vertices remain present after trimming, as well as what trimming curve vertices are to be incorporated into the trimmed polygon. Note that step 11 may have effectively divided the original polygon into two or more smaller polygons. Step 12 uses a simple procedure of nested loops to traverse the data structure prepared by step 11. A simplified representation of how that data structure would represent the situation of FIG. 14 is depicted in FIG. 15. The result of the traverse by step 12 is sequences of present polygon vertices that are sent by step 13 to a mechanism for actually displaying the polygons. Step 12 will produce one complete list of vertices for each present polygon or present subpolygon (a part of a polygon remaining after another part has been trimmed away) emerging from the trimming process.

FIG. 15 is a simplified illustration of one possible circularly linked list of vertex tables that could result from applying step 11C of FIG. 9B to the example of FIG. 14. The assumption was made that trimming curve #1 (for this particular polygon) starts (t=0) at point 68 of FIG. 14, and that the other two trimming curves start somewhere outside the subspan. The entire circularly linked list of FIG. 15 may be termed a boundary list. The Next Address field links untrimmed polygon vertices and points of intersection between the polygon edges and the trimming curves into the boundary list. Embedded within the boundary list are trimming curve sublists. The trimming curve sublists are linked by a combination of physical ordering and the Wrap Address field. There is one trimming curve sublist for each trimming curve. When a BEGIN is encountered while traversing the boundary list, a choice can be made to either continue along the boundary list or to switch over to traversing the trimming curve sublist. (The boundary list and the trimming curve sublist share BEGIN and END tables; to switch all that is needed is to follow the other chain of links.) If a trimming curve sublist is traversed to its END, the boundary will be reentered at that point.

Figure 16A:
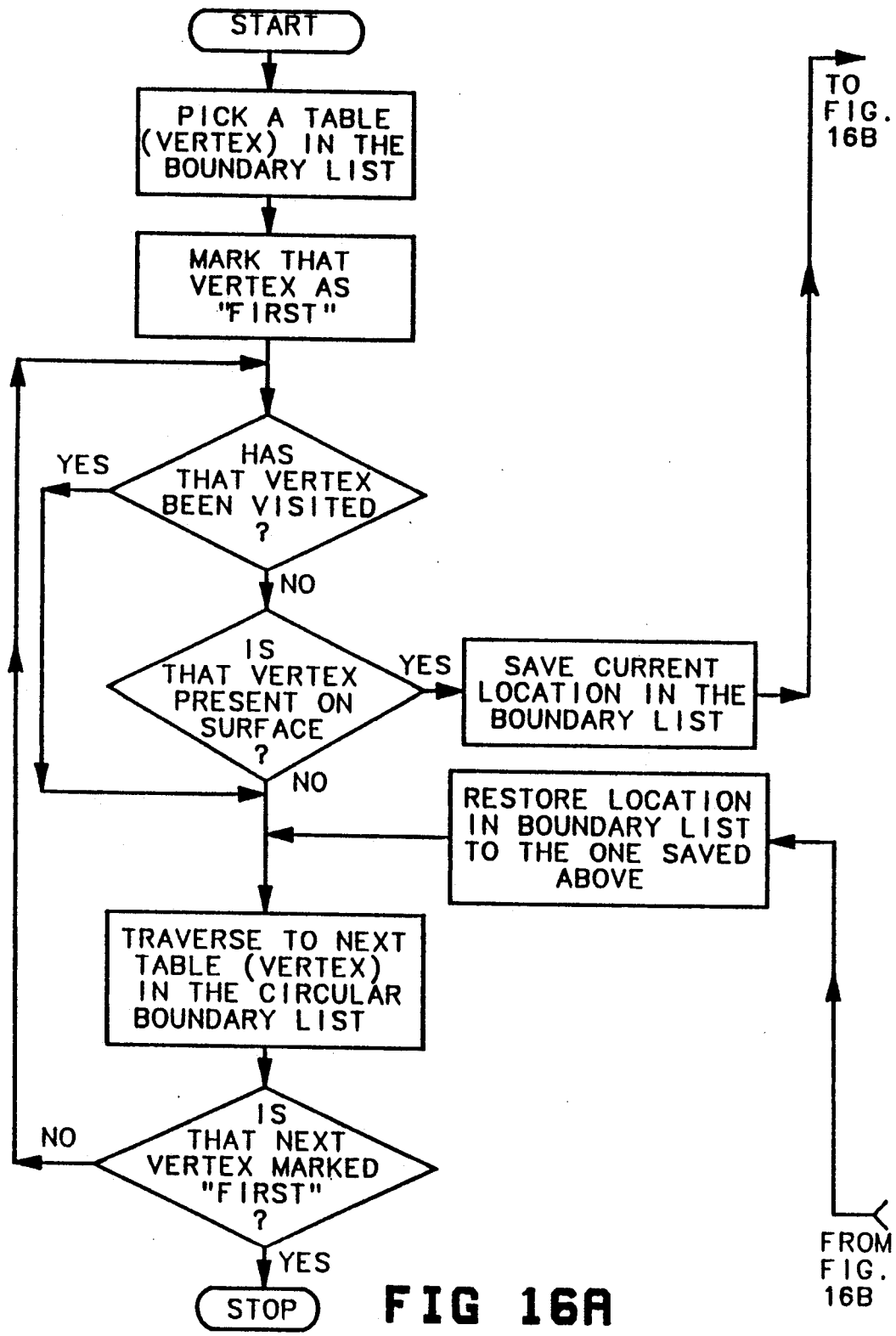
FIGS. 16A-C comprise a simplified flowchart for processing the linked list of vertex tables in accordance with step 12 of FIG. 9C.
Figure 16B:
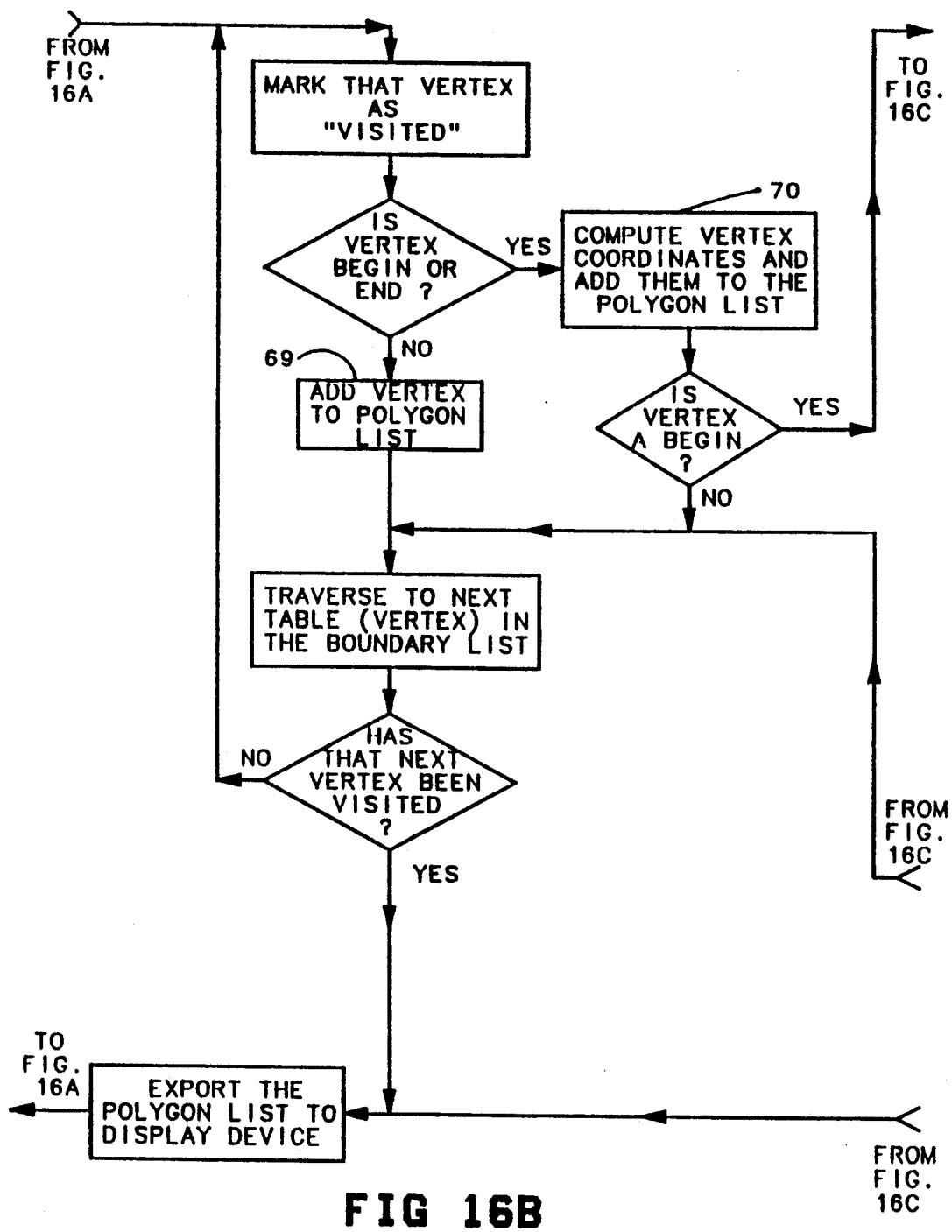
Figure 16C:
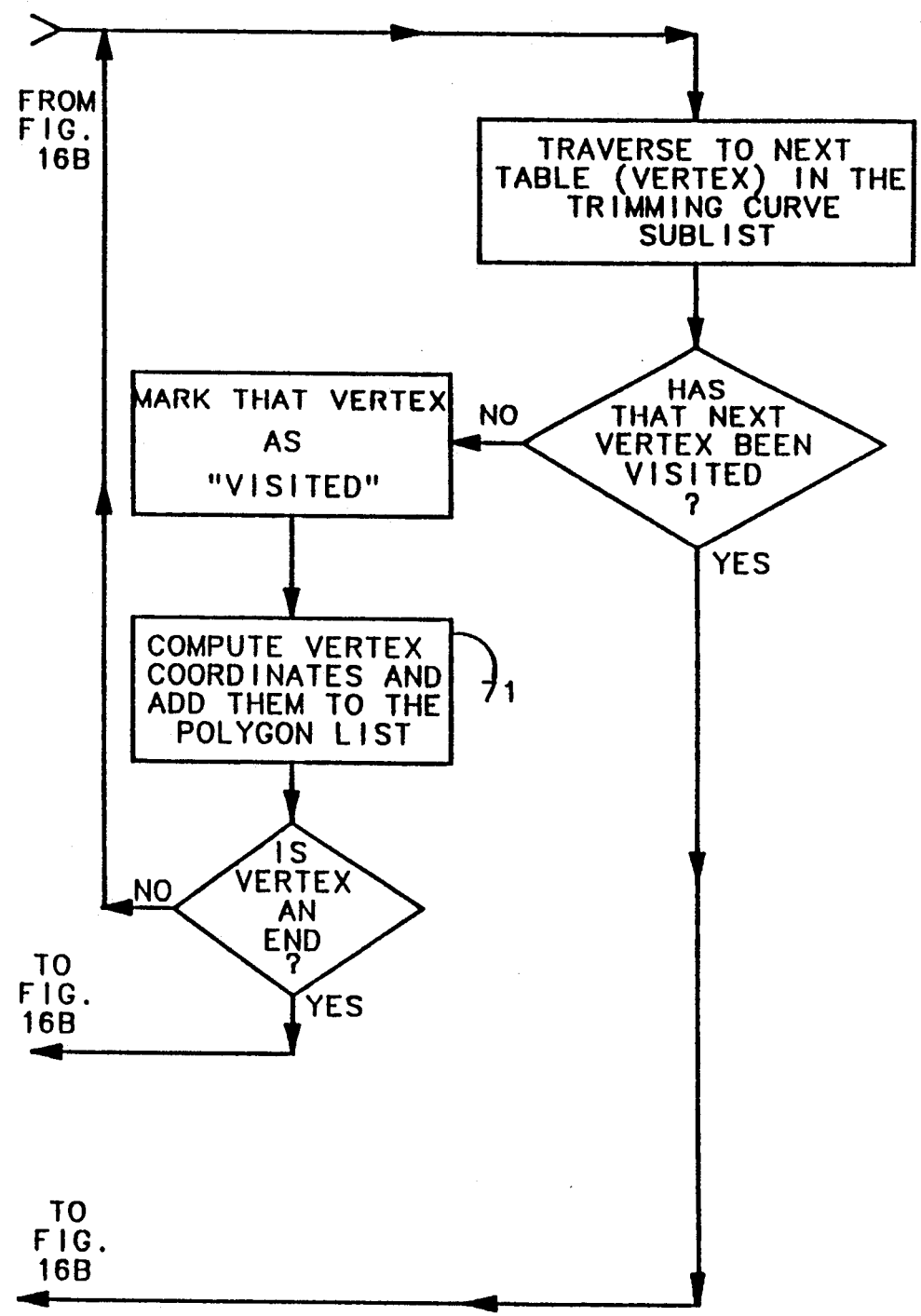

Step 12 is depicted in FIG. 16 as a simplified flowchart, and in FIG. 17 as pseudocode for operating upon the list of tables containing the information set out in step 8 of FIG. 9.

The flowchart of FIG. 16 is believed to be fairly self-explanatory when taken in the context of what has preceded it. It includes an outer loop, shown in FIG. 16A, that selects an arbitrary vertex in the circularly linked boundary list as an initial vertex that it then marks as having been "first". The outer loop then traverses the boundary list. When it discovers that it has gotten back to the vertex marked "first", the process is complete, and the loop terminates. The main activity of the outer loop is to identify vertices that have not yet been visited and that are ON the surface. When such a vertex is found it location in the boundary list is saved, so that the outer loop can resume traversing the list at this point after the middle and inner loops have been allowed to traverse the list on their own. With the outer loop thus "suspended", as it were, further processing of the list by the middle loop commences.

The middle loop adds to a polygon list any present non-timming curve vertices and identifies a BEGIN or END vertex. When a BEGIN vertex is found it is added to the polygon list and the inner loop is then entered. An END vertex is also added to the polygon list because it is a next vertex present ON the polygon, and because it has now been marked as visited, and will not be further processed if it is visited again.

The inner loop traverses a trimming curve sublist whose head has been reached by traversing along the boundary list with the outer and middle loops. The middle loop enters the inner loop after adding a BEGIN vertex to the polygon list; the inner loop returns to the middle loop when the balance of the trimming curve sublist has been entirely traversed and the associated vertices added to the polygon list. The middle loop then resumes its traverse of the boundary list. The inner loop is re-used as needed each time the head of a new trimming curve sublist is encountered. The middle loop will complete itself when an entire closed polygon has been added to the polygon list. This condition is detected when the middle loop returns to a vertex that has already been visited. This does not necessarily mean that the boundary list has been fully processed; trimming can cut an original polygon into two or more subpolygons. As long as the outer loop has not yet run to completion there may be more subpolygons described by the boundary list.

Upon the addition of a complete polygon to the polygon list the middle loop returns to the outer loop. It resumes its processing at the point in the boundary list where it left off. It continues to traverse the list looking for vertices that have not yet been visited. If it finds one it re-uses the middle loop to put another entire subpolygon onto the polygon list.

It is substantially easier to add vertex information to the polygon list for corner and extra vertices (operation 69 in FIG. 16) than it is for points along trimming curves (operations 70 and 71 in FIG. 16). The former information is computed, as mentioned previously, by the forward differencing technique. The latter information involves evaluating, for abritrary points in uv space, the vertex position in XYZ space and the surface normal vector at the vertex. While not conceptually difficult, this is a much more time consuming operation.

FIG. 17 is a simplified section of pseudocode to perform the same activity as set out in flowchart form in FIG. 16. The difference is that FIG. 17 incorporates more of the table structure described in connection with steps 8-11 of FIG. 9.

We conclude our exposition of a preferred method of trimming surface polygons with an examination of certain enhancements that may be incorporated into the method. We shall consider in the next few paragraphs ways to minimize the effects of a less than ideal parameterization of the trimming curve functions and to reduce to a minimum the number of trimming curves that must be considered while processing each subspan and its polygon.

Ideally, one would like equal steps in t to produce equal increments in u and equal increments in v. This property arises from the nature of the B-spline functions chosen to represent the trimming curves, and may obtain in greater or lesser degree. If such equality obtains it is said that there is a good parameterization for the trimming curve functions. A bad parameteization cannot always be avoided, and if left uncorrected for causes certain problems for the trimming process. Specifically, it can cause the number of polygon vertices for trimmed polygons to become unduly large. That, in turn, increases the amount of memory that must be allocated for the trimming of polygons. Rather than add memory to accommodate a phenomenon that has no particular benefit, a more satisfying approach is to examine the uv pairs produced by evaluating the trimming curve functions with a selected step size in t, and suppress those that are insufficiently distant from their predecessors. For further introduction to what we are about to discuss, refer to the description of FIG. 8.

Figure 18:
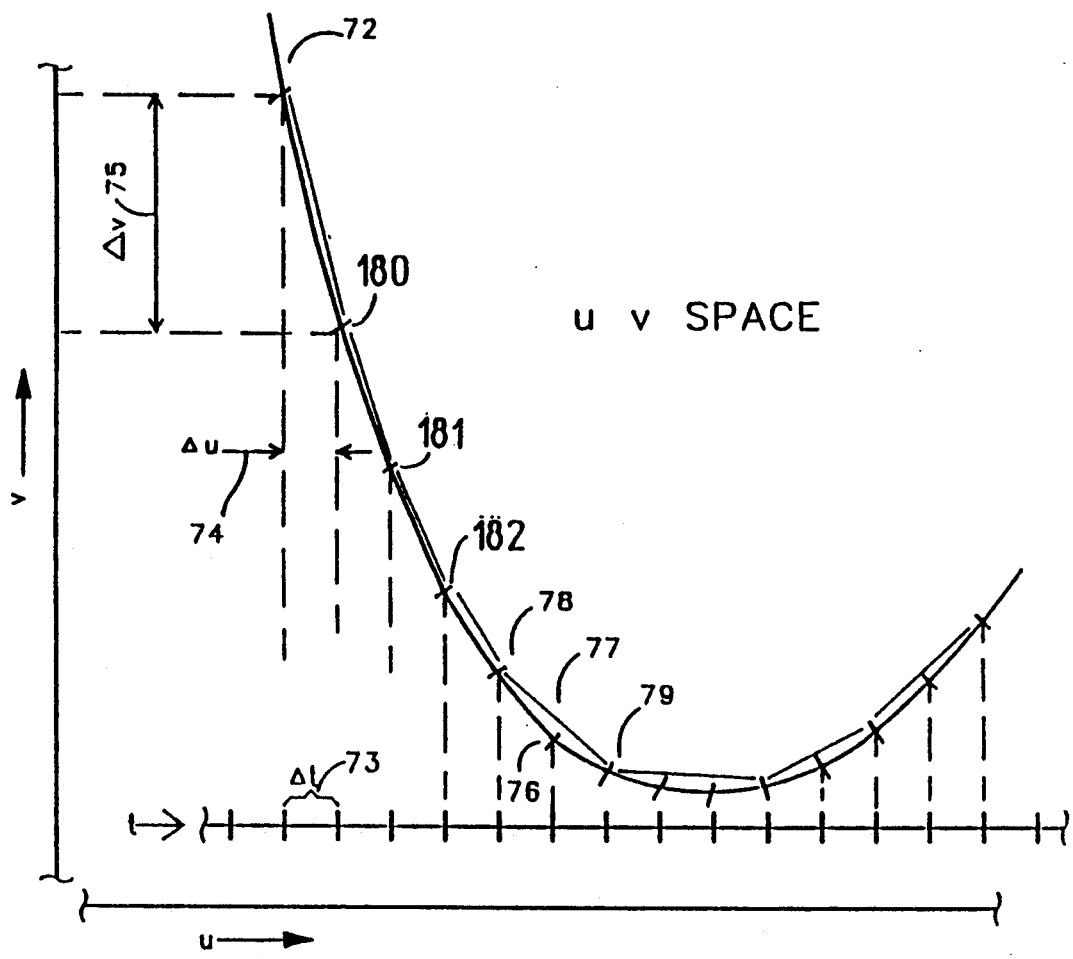
FIG. 18 is a diagram of a trimming curve in uv space illustrating a refinement in the selection of points in uv space representing the trimming curve in the operations of clipping and trimming.

Consider the trimming curve 72 shown in a span of uv space by FIG. 18. Equal step sizes of delta t 73 produce varying delta u's 74 and varying delta v's 75. Notice how the tick marks on the curve 72 are of varying distance apart; they are the evaluated coordinates in uv space corresponding to the equally spaced tick marks in t space.

From the discussion of FIG. 8 and of step 6 of FIG. 9 it will be recalled that a step size in t (delta t) is selected to produce maximums for delta u and delta v that are about equal to the distance between polygon vertices along the edge of the patch, which distance may be termed the edge step size. That is how the delta t 73 of FIG. 18 is selected. For the purpose of illustration, assume that the largest delta v 75 shown in FIG. 18 was used to determine delta t. In the illustration at hand the delta v's tend to be bigger than the delta u's. For a different trimming curve it might be the case that the largest delta u exceeds the largest delta v and would be used to select delta t. The process of selecting delta t is described in connection with step 6 of FIG. 9. Also, do not assume that the numerical value of delta t equals that of delta u. It only looks as if it does in the figure because the t axis has been scaled to "line up" under the u axis.

The straight line segment approximation of the trimming curve 72 that is obtained by evaluation at the equal step sizes of delta t 73 is refined by requiring that at least one of delta u and delta v exceed fifty-two percent of the edge mesh size. If neither does then that point in uv space is ignored, and the next one is considered, and so on. According to this technique, point 76 would be ignored, and straight line segment 77 would run from point 78 to point 79. The first point along each B-spline trimming curve segment is the initial point at which the point selection process begins. This ensures that the B-spline trimming curve segments join each other as intended.

The fifty-two percent criterion arises from a relationship that exists between the shortest and longest accepted straight line segments. The relationship involves an equality between the amount that a longest accepted straight line segment (one at forty-five degrees) exceeds the edge step size on the one hand, and the amount the shortest accepted straight line segment (one that is horizontal or vertical) is less than the edge step size on the other hand. It may be shown that the desired equality relationship obtains when the selection criterion is approximately fifty-two percent of the edge step size.

The number of trimming curves that must be considered while processing a subspan and its polygon may be reduced by use of the following technique. Simply put, information about the location of each trimming curve segment within the spa is associated with its B-spline definition. This information is used to eliminate from consideration those segments that cannot possibly intersect the subspan about to be processed.

Prior to the generation of the first polygon for a new patch a $v_{extent}$ is found for each B-spline segment of each trimming curve. The $v_{extent}$ is the range in v from the minimum v value to the maximum v value in the set of (u,v) pairs resulting from the parameterization refinement described in connection with FIG. 18. The $u_{extent}$ mentioned below is defined similarly. The $v_{extent}$ for each B-spline segment is stored in a location within a data structure containing the trimming curves for the patch.

Recall that polygons are generated with a row-wise ordering of the subspans. See the discussion of FIG. 10. At the beginning of each row of polygons the $v_{extent}$ of each trimming curve segment for the patch is inspected. Those trimming curve segments having a $v_{extent}$ that overlaps the range of v for the current row are further evaluated to discover their associated $u_{extent}$. The $u_{extent}$ for each such overlapping sement is also stored in the trimming curve data structure.

For each polygon along the row only those B-spline segments whose $u_{extent}$ and $v_{extent}$ both overlap the current subspan are considered in the clipping and trimming process described in connection with FIG. 6-16. For example, and with reference again to FIG. 6, trimming curve segment 80 would not be of interest for any subspan/polygon in row 82 of patch 12; segment 80 does not have a $v_{extent}$ that overlaps the $v_{extent}$ of row 82. On the other hand, the $v_{extent}$ of segment 81 does overlap that of row 82, and the $u_{extent}$ of segment 81 is computed prior to processing any of the supspans along row 82. Because the $u_{extent}$ of segment 81 overlaps the $u_{extent}$ of the subspan 83, the B-spline segment 81 of trimming curve 11 is included in the clipping and trimmng activities for that subspan. Segment 80 would not be included in the activities for any subspan/polygon along row 82, nor would it, for further example, be used in connection with subspan 84. And in the same manner, neither segment 80 nor segment 81 would be included in the activities for any subspan/polygon along row 85; no $v_{extent}$ for those segments overlaps that for the row.

Figure 19:
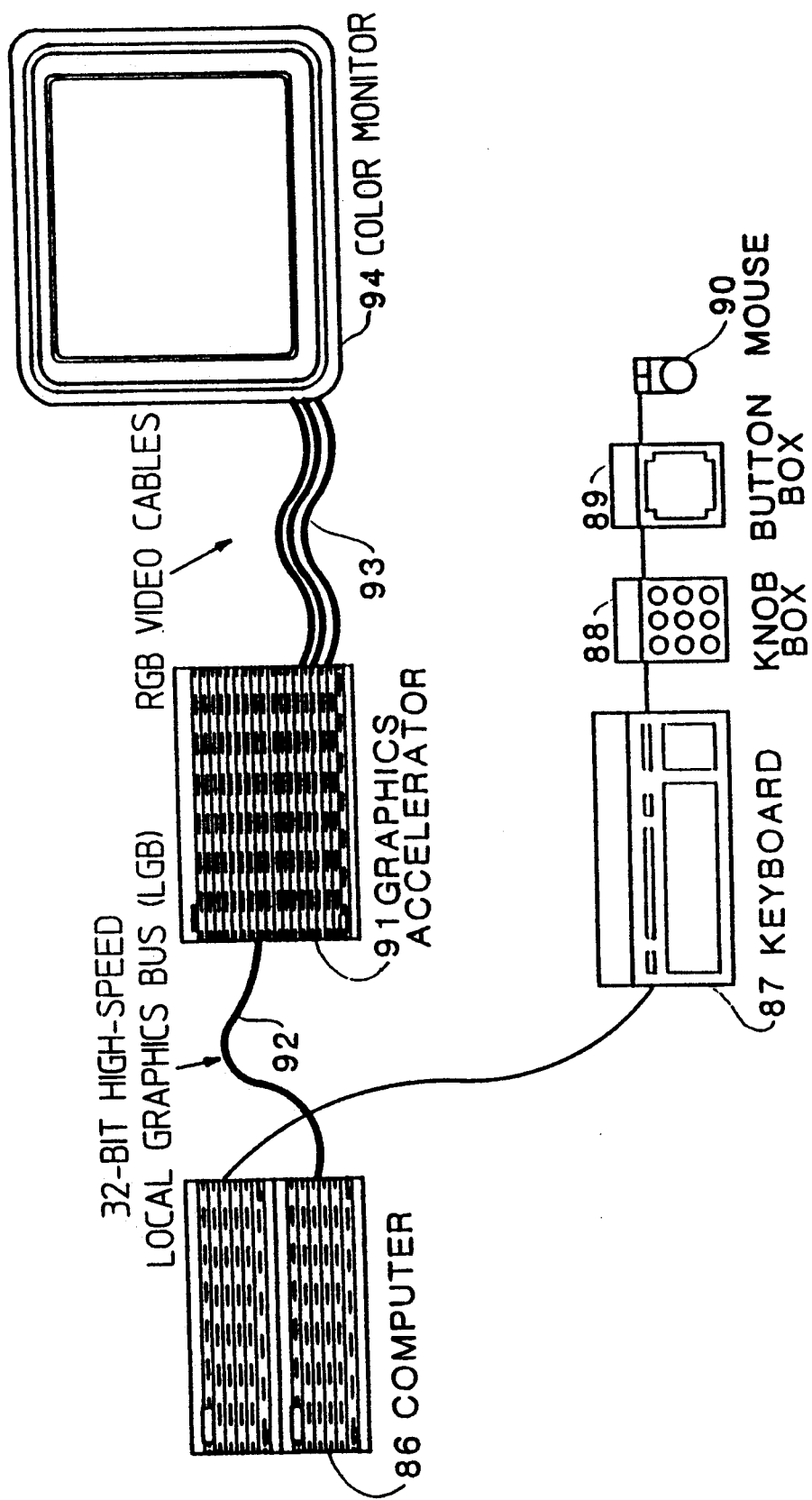
FIG. 19 is a simplified hardware block diagram of the component instruments used in an embodiment incorporating the preferred method of the invention.

Refer now to FIG. 19, wherein is shown a pictorial representation of an actual graphics system embodying the method of the invention. In particular, the graphics system includes a computer 86, a keyboard 87, a knob box 88, a button box 89 and a mouse 90. The computer 86 may execute the software, mentioned at the beginning of this Specification, which interacts with the user and prepares the B-spline descriptions of the surface and its trimming curves. The computer 86 is coupled to a grahics accelerator 91 through a high speed local graphics bus 92. The graphics accelerator 91 is in turn coupled to a color monitor 94 through three coaxial cables for carrying the Red, Green and Blue (RGB) video signals.

The trimming activities described above are performed entirely within the graphics accelerator 91. While it is conceivable that the trimming method that has been described could be carried out in software in the computer 86, such an approach necessarily incurs a substantial penalty through reduced performance compared with trimming by appropriate hardware. To accomplish this and other goals, the graphics accelerator 91 is responsive to the computer 86 through the execution of a number of commands. Among these are some that: instruct the graphics accelerator to store in a data structure the definition of one or more trimming curves; store in a data structure a surface patch definition and then render it with trimming according to the previously defined trimming curves; and a command to delete all previously defined trimming curves. Also included are commands to push and pop a stack of ON flags. The ON flags for the upper right and lower left corners of selected patches are saved on two separate stacks to facilitate the subdivision of patches. The subdivision of patches into subpatches arises when a given patch contains too many trimming curves; there are practical and cost related considerations (i.e., the amount of memory) that limit the number of trimming curves for any single patch that can be handled by the graphics accelerator 91.

The memory limitations mentioned above do not impose any practical restrictions on the number of trimming curves that may apply to a patch. The software in the computer determines the need for patch subdivision when the number of trimming curve segments for a given patch exceeds approximately forty to sixty. (The software can either anticipate limitations in the graphics accelerator, or subdivide in response to an indicated overflow returned by the graphics accelerator.) A previously undivided patch can be divided up to sixteen times. Each act of subdivision can divide the patch at hand into four subpatches.

Each time a subdivision occurs the saved ON flags for the appropriate other patches already rendered are pushed on their stacks. There is one stack for vertex I of the first polygon of the last row of polygons of each patch, and another stack for vertex III of the last polygon of the first row of polygons of each patch. These stacks are separately maintained in cooperation with the software executed by the computer 86. The resulting mechanism for patch subdivision is transparent to the described method for trimming patches. That method always operates the same way, regardless of whether the patch at hand is a subpatch or not.

Figure 20B:
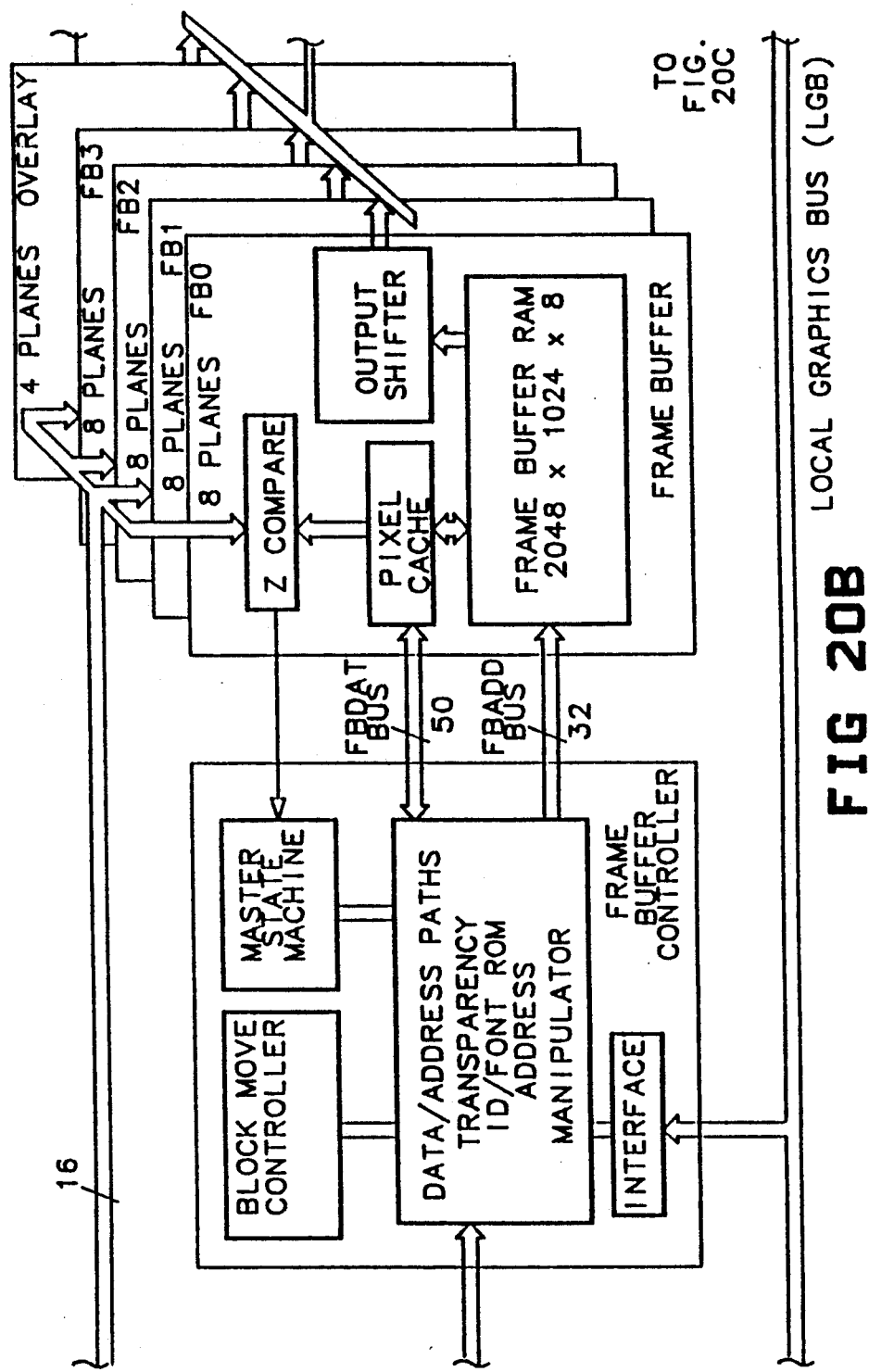

FIGS. 20A-C comprise a block diagram of the graphics accelerator 91 shown in FIG. 19. An interface mechanism 95 couples the trimming curve and patch definition commands from the computer 86 to a transform engine 96. The definitions are stored by a microsequencer 97 in a data RAM 98. The microsequencer operates upon these definitions to produce the coordinates of the vertices for the trimmed polygons. Screen coordinates for the vertices of the trimmed polygons are sent via a DC (Device Coordinate) Bus 99 to a scan converter 100, where the process of polygon rendering is further carried out at the pixel level (e.g., area fill and color interpolation for shading).

The microsequencer 97 operates in conjunction with various integer and floating point arithmetic units, and may, for example, be an AMD 2910 from Advanced Micro Devices.

I claim:

1. A method of rendering with a graphics system an image of an object's surface comprising the steps of:
   (a) representing an original surface of an original object with a first mapping whose range is an XYZ space containing the original object and whose domain is a two dimensional uv space;
   (b) representing a trimming curve in the uv space with a second mapping whose range is the uv space and whose domain is a single dimensional t space, the trimming curve, when mapped into the XYZ space with the first mapping, describing a boundary of a portion of the original surface of the original object that is to be deleted therefrom to form an altered surface of an altered object;
   (c) selecting an initial step size in t space;
   (d) mapping with the second mapping consecutive values of t differing by the initial step size into consecutive points in uv space along the trimming curve;
   (e) determining a distance between each of the consecutive points and its successor in the consecution of consecutive points in uv space mapped in step (d);
   (f) adjusting the initial step size in accordance with the inequality between the largest distance determined in step (e) and a preselected distance;
   (g) mapping the trimming curve into uv space beginning with a preselected value of t as an initial value and thereafter with successive increments to that initial value by the adjusted step size;
   (h) altering the original surface of the original object by removing from the domain of the first mapping points in uv space that are on one side of the trimming curve as mapped into uv space by step g; and
   (i) creating a visible image of the altered surface of the altered object by making visible in the graphics system only those pixels corresponding to points remaining on the altered surface of the altered object.

2. A method as in claim 1 wherein step (e) comprises the step of determining the larger of the largest change in distance along the u axis among the consecutive points and the largest change in distance along the v axis among the consecutive points.

3. A method as in claim 1 wherein step (f) comprises the step of adjusting the initial step size by the ratio of the preselected distance of step (f) to the largest distance determined in step (e).

4. A method as in claim 1 further comprising the step of deleting from along the trimming curve mapped by step (g) points therealong not at least a selected minimum distance in uv space away form a preceding point that is also along the trimming curve and that was not itself deleted.

* * * * *